United States Patent
Kurokawa et al.

(10) Patent No.: US 7,637,345 B2
(45) Date of Patent: Dec. 29, 2009

(54) FRAME OF MOTORCYCLE AND ENGINE BRACKET

(75) Inventors: Nobuhiko Kurokawa, Aioi (JP);
Yoshihiro Masuda, Kobe (JP); Takehiro Nakashima, Akashi (JP); Akira Takasu, Akashi (JP); Toshiyuki Miyake, Miki (JP)

(73) Assignee: Kawasaki Jukogyo Kabushiki Kaisha, Kobe-shi, Hyogo (JP)

( * ) Notice: Subject to any disclaimer, the term of this patent is extended or adjusted under 35 U.S.C. 154(b) by 387 days.

(21) Appl. No.: 11/315,584

(22) Filed: Dec. 21, 2005

(65) Prior Publication Data
US 2006/0169511 A1    Aug. 3, 2006

(30) Foreign Application Priority Data

| Dec. 24, 2004 | (JP) | ............................. 2004-372597 |
| Jan. 31, 2005 | (JP) | ............................. 2005-023418 |
| Apr. 1, 2005 | (JP) | ............................. 2005-105937 |

(51) Int. Cl.
*B62D 21/00*    (2006.01)
(52) U.S. Cl. .................................. 180/311; 180/219
(58) Field of Classification Search ................. 180/219, 180/311
See application file for complete search history.

(56) References Cited

U.S. PATENT DOCUMENTS

| 5,016,725 | A * | 5/1991 | Muramatsu ................. 180/225 |
| 6,601,666 | B2 * | 8/2003 | Okuma et al. ............... 180/227 |
| 6,679,347 | B2 * | 1/2004 | Iimuro ........................ 180/219 |
| 6,695,089 | B2 * | 2/2004 | Adachi et al. ............... 180/311 |
| 6,779,620 | B2 * | 8/2004 | Taniguchi et al. ........... 180/219 |
| 6,969,083 | B2 * | 11/2005 | Egan .......................... 280/291 |
| 2001/0030072 | A1 * | 10/2001 | Okuma ....................... 180/219 |
| 2001/0045312 | A1 * | 11/2001 | Adachi et al. ............... 180/219 |
| 2002/0189878 | A1 * | 12/2002 | Iimuro ........................ 180/219 |
| 2004/0206565 | A1 * | 10/2004 | Nagashii et al. ............. 180/219 |
| 2004/0255909 | A1 * | 12/2004 | Kurokawa et al. .......... 123/472 |
| 2006/0169511 | A1 * | 8/2006 | Kurokawa et al. .......... 180/219 |

FOREIGN PATENT DOCUMENTS

| JP | SHO 59-110791 | 7/1984 |
| JP | HEI 2-117987 | 9/1990 |
| JP | HEI. 7-71953 | 2/1995 |
| JP | 2004-330999 | 11/2004 |
| JP | 2004-331001 | 11/2004 |

* cited by examiner

*Primary Examiner*—Lesley D Morris
*Assistant Examiner*—Tashiana Adams
(74) *Attorney, Agent, or Firm*—Alleman Hall McCoy Russell & Tuttle LLP

(57) ABSTRACT

A frame of a motorcycle includes a head pipe configured to support a steering shaft, a first frame configured to extend from the head pipe, through above and rearward of an engine, and to rearward of a vehicle body, a second frame that is located under the first frame and configured to extend from the head pipe, through forward and downward of the engine, and to rearward of the vehicle body, a bracket by which a first component is mounted to the second frame, and a coupling member that is mounted to the second frame to couple a second component to the second frame, and the bracket is integral with the coupling member. An engine bracket of a motorcycle is manufactured by forging such that a region subjected to tensile stress is made thicker than a region in the vicinity of the region which is subjected to the tensile stress.

4 Claims, 15 Drawing Sheets under corners. The brackets are required to have strength. In order to allow the rider to easily manipulate a vehicle body during cornering, the brackets are required to have flexibility and be lightweight. Conventional brackets by which the engine is coupled to the frame are constructed of plates with a predetermined uniform thickness to have desired strength. Since the entirety of the brackets is of a predetermined uniform thickness, weight increases and suitable flexibility is difficult to obtain. If the thickness of the brackets is adjusted to provide suitable flexibility, then desired strength may be difficult to obtain.

FRAME OF MOTORCYCLE AND ENGINE BRACKET

TECHNICAL FIELD

The present invention generally relates to a frame of a motorcycle, and an engine bracket by which an engine is mounted to the frame.

BACKGROUND ART

Some frames of motorcycles include a head pipe that supports a steering shaft with a steering handle attached to an upper portion thereof, a main frame extending rearward from the head pipe, a down tube extending downward from the head pipe, a lower frame extending substantially rearward from a lower end portion of the down tube, and a pivot frame (also referred to as a swing arm bracket) extending downward from a rear end portion of the main frame, by which a rear end portion of the lower frame is coupled to the rear end portion of the main frame. Such a construction is disclosed in Japanese Laid-Open Patent Application Publication Nos. 2004-331001 and 2004-330999.

Various components are incorporated into the frame including the main frame, the pivot frame, the down tube, and the lower frame. One exemplary component is an engine mounted in the frame by a plurality of brackets. In the case of a water-cooled engine, a radiator is disposed in front of the down tube and is mounted on the down tube by brackets. Especially in motocross motorcycles, an engine guard is disposed to cover an engine from below and is mounted on the lower frame by brackets. In order to enable the main frame and the down tube to be firmly coupled to the head pipe, the main frame and the down tube are sometimes coupled to each other by reinforcing gussets.

Typically, the brackets and the gussets are manufactured separately and welded to the frame. In this case, it is necessary to weld the brackets and other components to the frame so that the components, for example, the engine, the radiator and the gussets, are incorporated into the frame with positioning accuracy. The process for welding a number of components is complicated, making it difficult to improve productivity.

Other frames of motorcycles include right and left main frames extending rearward from a head pipe, right and left pivot frames extending downward from rear end portions of the main frames, and a cross member coupling the right and left pivot frames to each other. A swing arm for rotatably supporting a rear wheel at a rear end thereof is vertically pivotally mounted at a front end portion thereof to one of the right and left pivot frames, and a suspension unit such as a shock absorber is disposed between the swing arm and the cross member and is mounted to the cross member by brackets mounted on the cross member.

In a frame thus constructed, a large load is applied to the main frames, the pivot frames, and the cross member. Since the engine, which has a large weight, is supported by the main frames and the pivot frames via the brackets, the load of the engine is applied to the respective frames. During travel of the motorcycle, a rider and the motorcycle are supported by a front suspension unit mounted to a front fork extending downward from the steering shaft and a rear suspension unit mounted between the swing arm and the cross member, a large load is applied to the cross member on which the rear suspension unit is mounted. Therefore, it is desirable to firmly couple the main frames, the pivot frames, and the cross member to each other.

Exemplary brackets by which the engine is coupled to the frames are disclosed in Japanese Published Examined Application No. Hei. 7-71953. The brackets are constructed of flat plates.

Since the engine has a large weight as described above, the brackets by which the engine is coupled to the frame are required to have strength. In order to allow the rider to easily manipulate a vehicle body during cornering, the brackets are required to have flexibility and be lightweight. Conventional brackets by which the engine is coupled to the frame are constructed of plates with a predetermined uniform thickness to have desired strength. Since the entirety of the brackets is of a predetermined uniform thickness, weight increases and suitable flexibility is difficult to obtain. If the thickness of the brackets is adjusted to provide suitable flexibility, then desired strength may be difficult to obtain.

SUMMARY OF THE INVENTION

The present invention addressees the above described conditions, and an object of the present invention is to provide a vehicle frame structure of a motorcycle that improves assembling efficiency by reducing welded components. Another object of the present invention is to provide a vehicle frame structure of a motorcycle in which a main frame, a pivot frame, and a cross member are firmly coupled to each other. A further object of the present invention is to provide an engine bracket that has suitable strength, stiffness, and flexibility, and is configured to couple an engine to a vehicle frame.

According to one aspect of the present invention, there is provided a frame of a motorcycle comprising a head pipe configured to support a steering shaft, a first frame configured to extend from the head pipe, through an area above and rearward of an engine, and to an area rearward of a vehicle body of the motorcycle, a second frame that is located under the first frame and is configured to extend from the head pipe, through an area forward and downward of the engine, and to an area rearward of the vehicle body, a bracket by which a first component is mounted to the second frame, and a coupling member that is mounted to the second frame and is configured to couple a second component to the second frame, wherein the bracket is integral with the coupling member to form a unitary piece.

In a frame thus constructed, the number of parts to be separately welded to the frames decreases, and the assembly process is conducted efficiently while assuring positioning accuracy with which components are mounted to the frame.

The first frame may include a main frame that is coupled to the head pipe and configured to extend rearward of the vehicle body. The second frame may include a down tube that is coupled to the head pipe and configured to extend downward from the head pipe and a lower frame configured to extend from a lower portion of the down tube, through an area under the engine, and to an area rearward of the vehicle body. The coupling member may include a gusset configured to couple the main frame to an upper portion of the down tube. The bracket may include a radiator mounting bracket by which a radiator is mounted to the down tube. The gusset may be integral with the radiator mounting bracket to form a unitary piece. Since the gusset is integral with the radiator mounting bracket, it is not necessary to weld these components separately.

The gusset may include a base portion that is disposed behind the upper portion of the down tube and is configured to couple the main frame to the down tube, and an extending portion configured to extend forward of the vehicle body from the base portion to a lateral side of the down tube. The radiator mounting bracket may be integral with the extending portion to form a unitary piece. Since it is not necessary to manufacture the gusset and the radiator mounting bracket separately, the number of components decreases.

The bracket may include an engine mounting bracket by which the engine is mounted to the second frame. The coupling member may include a guard mounting member by which the second frame is coupled to an engine guard configured to cover the engine from below. The engine mounting bracket may be integral with the guard mounting member to form a unitary piece. Since the engine mounting bracket is integral with the guard mounting member, it is not necessary to weld these components separately.

The second frame may include a down tube that is coupled to the head pipe and configured to extend downward from the head pipe and a pair of right and left lower frames configured to extend from a lower portion of the down tube, through an area under the engine, and to an area rearward of the vehicle body. The engine mounting bracket may have a base portion that is mounted on an upper region at a position on each of the right and left lower frames and is configured to mount the engine to each of lower frames, and a protruding portion configured to protrude from the base portion toward a center in rightward and leftward (lateral) direction of the vehicle body. The guard mounting member may be integral with the protruding portion of the engine mounting bracket to form a unitary piece. In a frame thus constructed, the engine mounting bracket and guard mounting member are made into a unitary piece with a simple construction.

The first frame may include right and left main frames that are coupled to the head pipe and are configured to extend rearward of the vehicle body, right and left pivot frames that are respectively coupled to rear portions of the main frames and are configured to extend downward from the rear portions of the main frames, and a cross member that is configured to extend rightward and leftward (laterally) and to couple upper portions of the right and left pivot frames to each other. The cross member may be provided with a suspension bracket to which a suspension unit configured to support a rear wheel is mounted, the cross member being integral with the suspension bracket to form a unitary piece. The cross member may have cross member connecting portions respectively connected to the main frames and the pivot frames.

Since each of the right and left connecting portions of the cross member is connected to the main frame and to the pivot frame so as to cover the coupled portion of the main frame and the pivot frame, the main frame and the pivot frame are coupled to each other firmly.

Each of the cross member connecting portions may have a front connecting portion that is configured to extend forward along the main frame and is connected to the main frame, and a lower connecting portion that is configured to extend downward along the pivot frame and is connected to the pivot frame. In such a construction, the main frame and the pivot frame are coupled to each other more firmly and, further, the cross member, the main frame, and the pivot frame are coupled to each other firmly.

Each of the cross member connecting portions may be connected to an upper region and a side region of the main frame and the pivot frame. In such a construction, the main frame and the pivot frame are coupled to each other more firmly and, further, the cross member, the main frame, and the pivot frame are coupled to each other firmly.

A concave portion may be formed on each of opposite side walls of upper portions of the right and left pivot frames, and each of the cross member connecting portions is connected to the pivot frame so as to cover the concave portion. In such a construction, a lightweight pivot frame is achieved while ensuring firm coupling between the frames and between the frames and the cross member.

One end portion of a rear end portion of the main frame and an upper end portion of the pivot frame may be configured to have a recess in a side view, and the other end portion is configured to have a protrusion that conforms in shape to the recess. The recess and the protrusion may be coupled to each other to form a connecting portion of the rear end portion of the main frame and the upper end portion of the pivot frame. Each of the cross member connecting portions of the cross member may be connected to the connecting portion. In such a construction, the main frame and the pivot frame are coupled to each other firmly so as not to deviate in the vertical direction, and long weld length is ensured.

The frame may further comprise an engine bracket by which a first frame is coupled to the engine. The engine bracket may be configured to be manufactured by forging such that a region which is subjected to tensile stress is larger in thickness than a region in the vicinity of the region which is subjected to the tensile stress, with the first frame coupled to the engine by the engine bracket.

In the engine bracket thus configured, the region which is required to have strength sufficient to withstand the tensile stress is made thicker, therefore the engine bracket is able to have suitable strength. In addition, the region in the vicinity of the region that is subjected to the tensile stress is adjusted to have suitable flexibility while achieving a lightweight engine bracket. Furthermore, a strong and lightweight engine bracket may be manufactured by a forging process.

The engine bracket may include a frame side connecting portion connected to the first frame and an engine side connecting portion connected to the engine disposed under the first frame. A front portion of the engine bracket that is located between the frame side connecting portion and the engine side connecting portion may be formed to have a thickness larger than a region located rearward of the front portion. Since the tensile stress is generated in the front portion of the engine bracket, the front portion is made thicker to obtain optimized strength, stiffness, and weight.

The frame side connecting portion may be provided with two first threaded hole portions connected to the first frame, the two first threaded hole portions may include a front threaded hole portion and a rear threaded hole portion located rearward of the front threaded hole portion, and the engine side connecting portion may be provided with a second threaded hole portion connected to the engine, the first threaded hole portions being made thicker than a region in the vicinity of the first threaded hole portions. A rib portion configured to connect the front threaded hole portion of the two first threaded hole portions to the second threaded hole portion may be formed on the engine bracket so as to form the front portion of the engine bracket. In such a construction, the strength, stiffness, and weight of the engine bracket can be easily optimized.

According to another aspect of the present invention, there is provided a frame of a motorcycle comprising a head pipe configured to support a steering shaft, right and left main frames respectively configured to extend rearward of a vehicle body of the motorcycle from the head pipe, right and left pivot frames that are respectively coupled to rear portions of the main frames and are configured to extend downward from the rear portions of the main frames, and a cross member that is configured to extend rightward and leftward (laterally) and to couple upper portions of the right and left pivot frames to each other. The cross member may be provided with a suspension bracket by which a suspension unit configured to support a rear wheel is mounted, and the cross member is integral with the suspension bracket to form a unitary piece. The cross member may have cross member connecting portions respectively connected to the main frames and the pivot frames.

Since each of the right and left connecting portions of the cross member is connected to the main frame and to the pivot frame so as to cover the coupled portion between the main frame and the pivot frame, the main frame and the pivot frame are coupled to each other firmly.

Each of the cross member connecting portions may have a front connecting portion that is configured to extend forward along the main frame and is connected to the main frame and a lower connecting portion that is configured to extend downward along the pivot frame and is connected to the pivot frame. In such a construction, the main frame and the pivot frame are coupled to each other more firmly and, further, the cross member, the main frame, and the pivot frame are coupled to each other firmly.

Each of the cross member connecting portions may be connected to an upper region and a side region of the main frame and the pivot frame. Thereby, the main frame and the pivot frame are coupled to each other firmly, and the main frame and the pivot frame are coupled to the cross member more firmly.

A concave portion may be formed on each of opposite side walls of upper portions of the right and left pivot frames, and each of the cross member connecting portions may be connected to the pivot frame so as to cover the concave portion. In such a construction, a lightweight pivot frame is achieved while ensuring firm coupling between the frames and between the frames and the cross member.

One end portion of a rear end portion of the main frame and an upper end portion of the pivot frame may be configured to have a recess in a side view, and the other end portion is configured to have a protrusion that conforms in shape to the recess. The recess and the protrusion may be coupled to each other to form a connecting portion of the rear end portion of the main frame and the upper end portion of the pivot frame. Each of the cross member connecting portions of the cross member may be connected to the connecting portion. In such a construction, the main frame and the pivot frame are coupled to each other firmly so as not to deviate in the vertical direction, and long weld length is ensured.

According to another aspect of the invention, an engine bracket by which a frame of a vehicle is coupled to an engine of the vehicle may be provided. The engine bracket is typically configured to be manufactured by forging such that a region which is subjected to tensile stress is larger in thickness than a region in the vicinity of the region which is subjected to the tensile stress, with the frame coupled to the engine by the engine bracket.

In an engine bracket thus configured, the region which is required to have strength sufficient to withstand the tensile stress is made thicker, and the engine bracket is able to have suitable strength. In addition, the region in the vicinity of the region that is subjected to the tensile stress is adjusted to have suitable flexibility while achieving a lightweight engine bracket. Furthermore, a strong and lightweight engine bracket may be manufactured by a forging process.

The engine bracket may include a frame side connecting portion connected to the upper frame and an engine side connecting portion connected to the engine disposed under the first frame. A front portion of the engine bracket that is located between the frame side connecting portion and the engine side connecting portion may be formed to have a thickness larger than a region located rearward of the front portion. Since the tensile stress is generated in the front portion of the engine bracket, the front portion is made thicker to obtain optimized strength, stiffness, and weight.

The frame side connecting portion may be provided with two first threaded hole portions connected to the first frame, the two first threaded hole portions may include a front threaded hole portion and a rear threaded hole portion located rearward of the front threaded hole portion, and the engine side connecting portion may be provided with a second threaded hole portion connected to the engine, the first threaded hole portions being made thicker than a region in the vicinity of the first threaded hole portions. A rib portion configured to connect the front threaded hole portion of the two first threaded hole portions to the second threaded hole portion may be formed on the engine bracket so as to form the front portion of the engine bracket. In such a construction, the strength, stiffness, and weight of the engine bracket can be easily optimized.

The above and further objects and features of the invention will more fully be apparent from the following detailed description with accompanying drawings.

DETAILED DESCRIPTION

Figure 1:
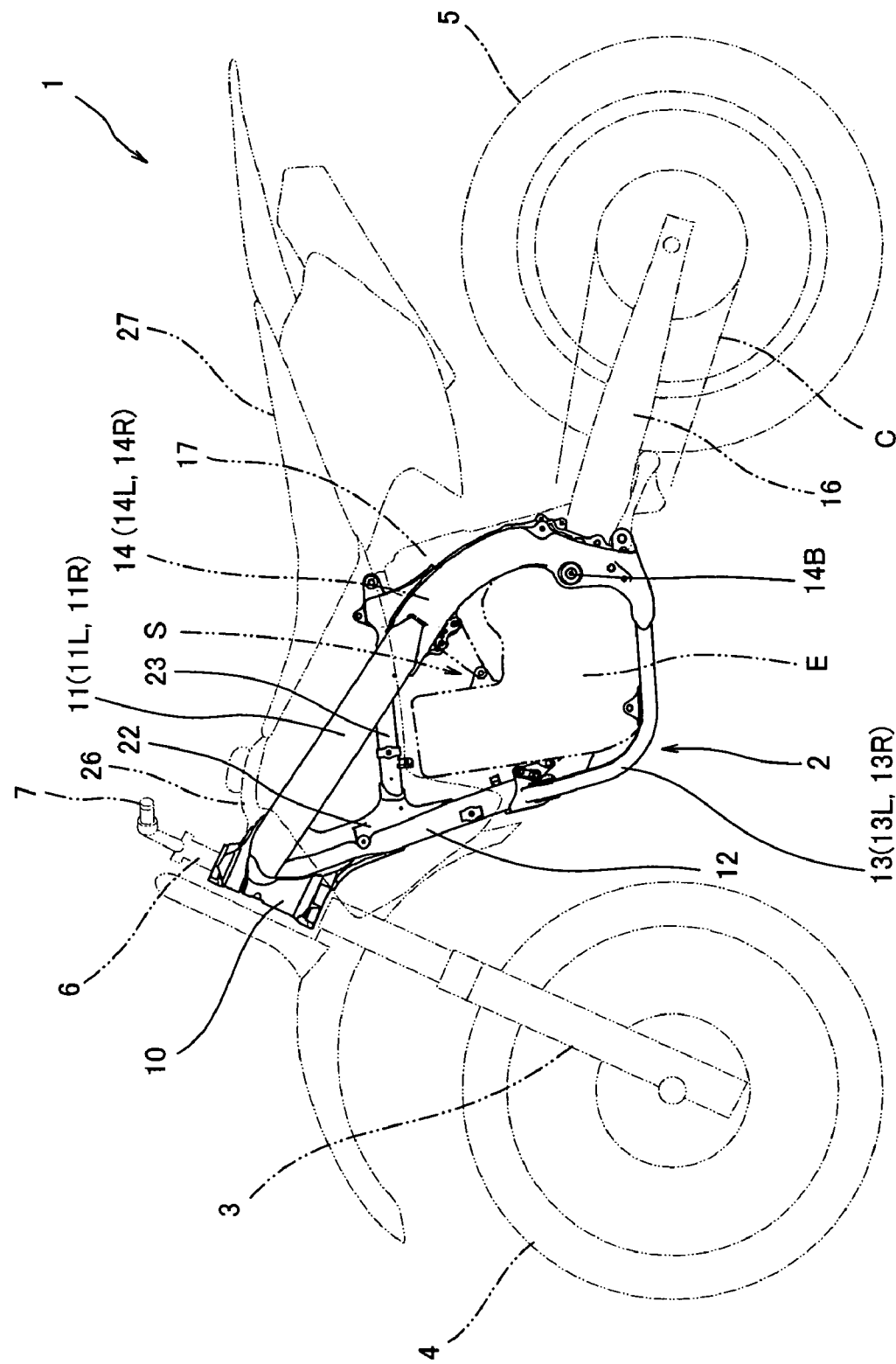
FIG. 1 is a side view of a motocross motorcycle comprising a frame according to an embodiment of the present invention.
Figure 2:
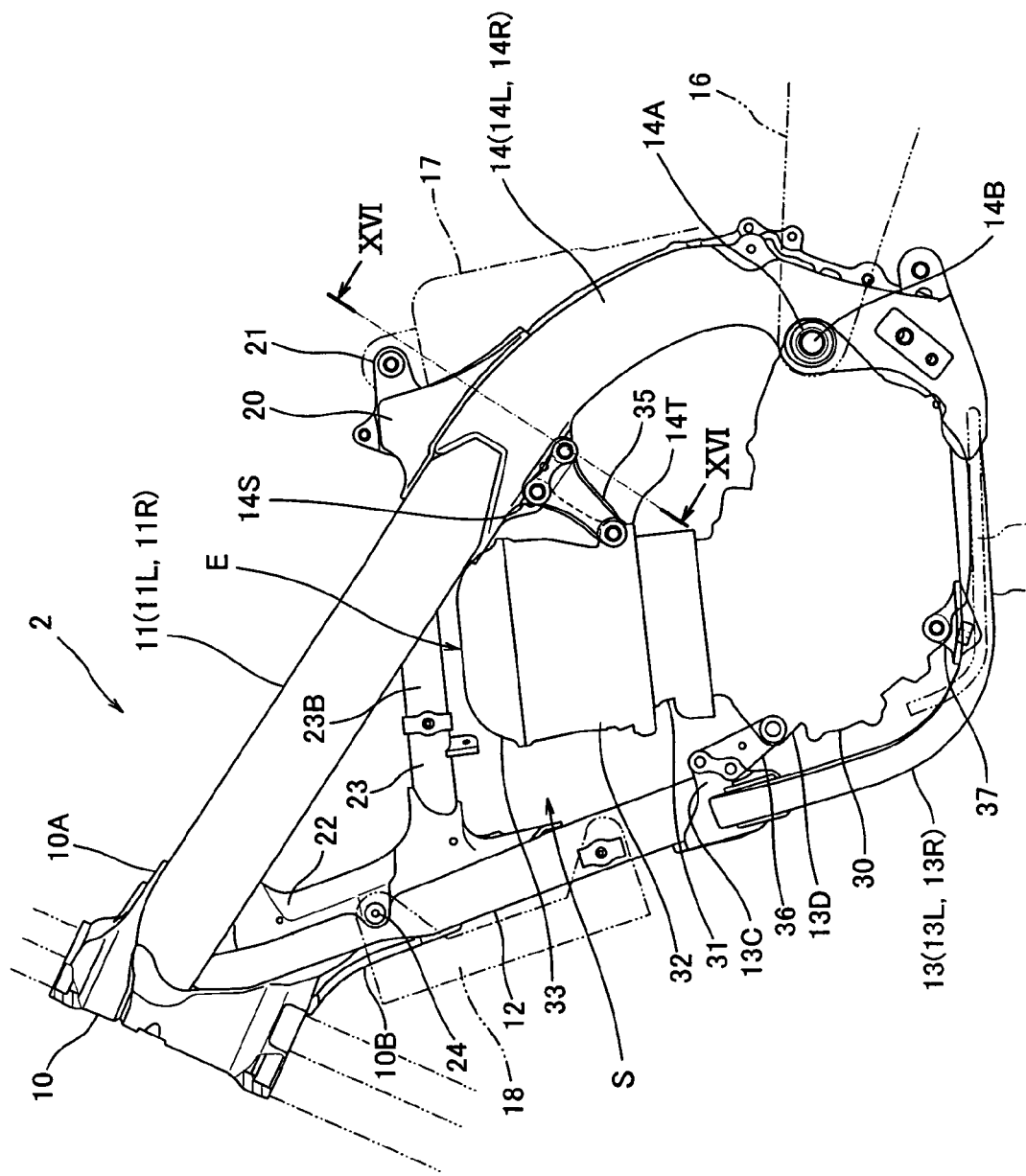
FIG. 2 is a side view of the frame of the motorcycle of FIG. 1.

Hereinafter, a frame of a motorcycle according to an embodiment of the present invention will be described with reference to the drawings. FIG. 1 is a side view of a motocross motorcycle 1. FIG. 2 is a side view of a frame 2 of the motorcycle 1 of FIG. 1. The frame 2 of this embodiment is typically made of aluminum alloy, however it will be appreciated that the frame may alternatively be made of other suitable materials. In FIG. 1, the frame 2 is illustrated by a solid line and the other parts are illustrated by two-dotted lines. Herein, directions are defined from the perspective of a rider (not shown) straddling the motorcycle 1.

Turning now to FIG. 1, the motorcycle 1 comprises a front fork 3 extending substantially vertically with a predetermined caster angle. A front wheel 4 which is a steering wheel is rotatably mounted to a lower portion of the front fork 3. A lower portion of the steering shaft 6 extending substantially vertically is coupled to an upper portion of the front fork 3. A bar-type steering handle 7 extending rightward and leftward (laterally) is attached at a center region thereof to an upper portion of the steering shaft 6. The frame 2 includes a head pipe 10 and a main frame (first frame) 11 extending slightly downward and rearward from an upper portion of the head pipe 10. The steering shaft 6 is rotatably mounted to the head pipe 10. The front wheel 4 is caused to turn to the right or to the left by the rider's operation of rotating the steering handle 7 to the right or to the left.

Figure 4:
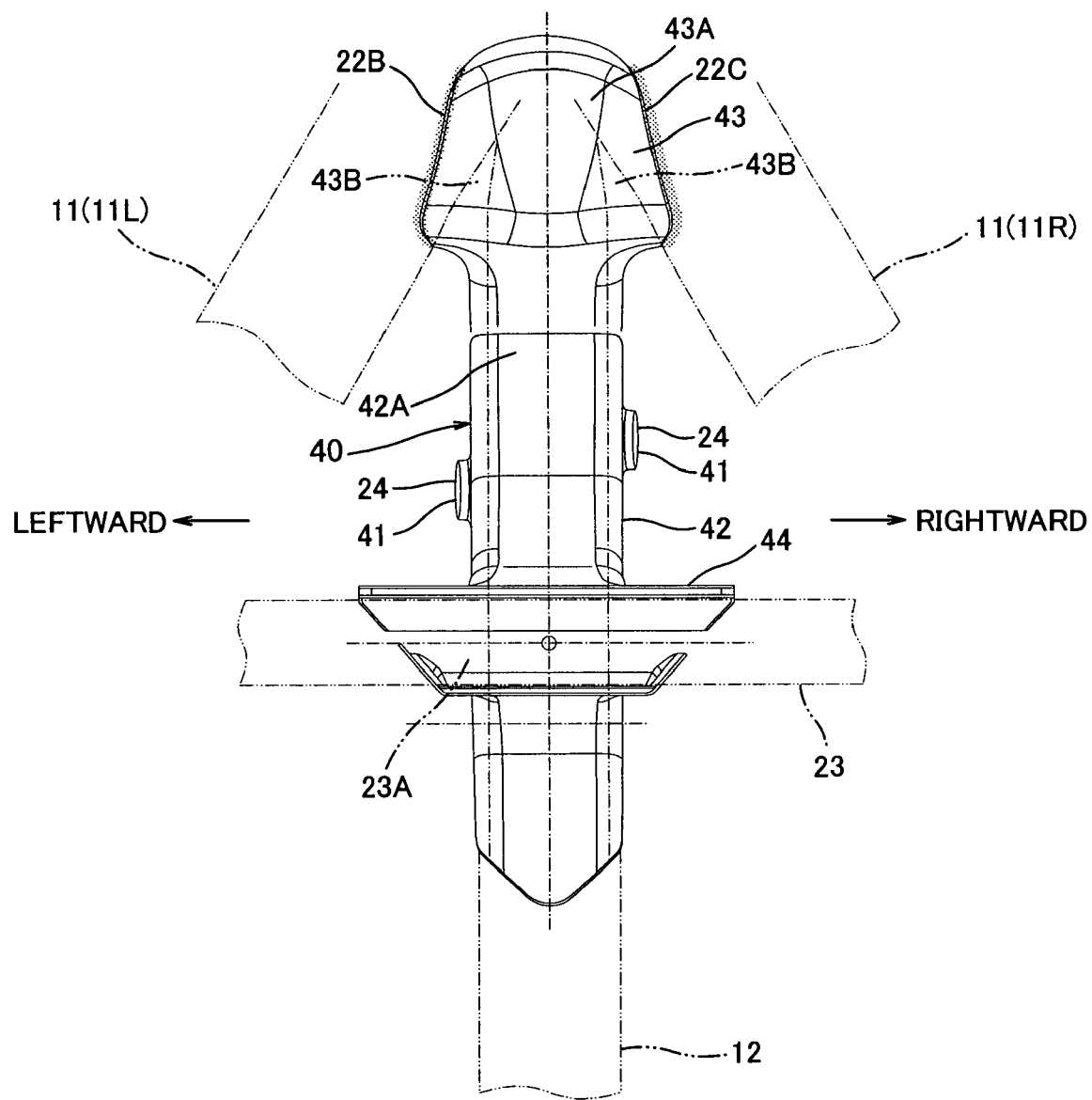
FIG. 4 is a rear view of the gusset of FIG. 3, as viewed in a direction of arrow IV in FIG. 3.
Figure 5:
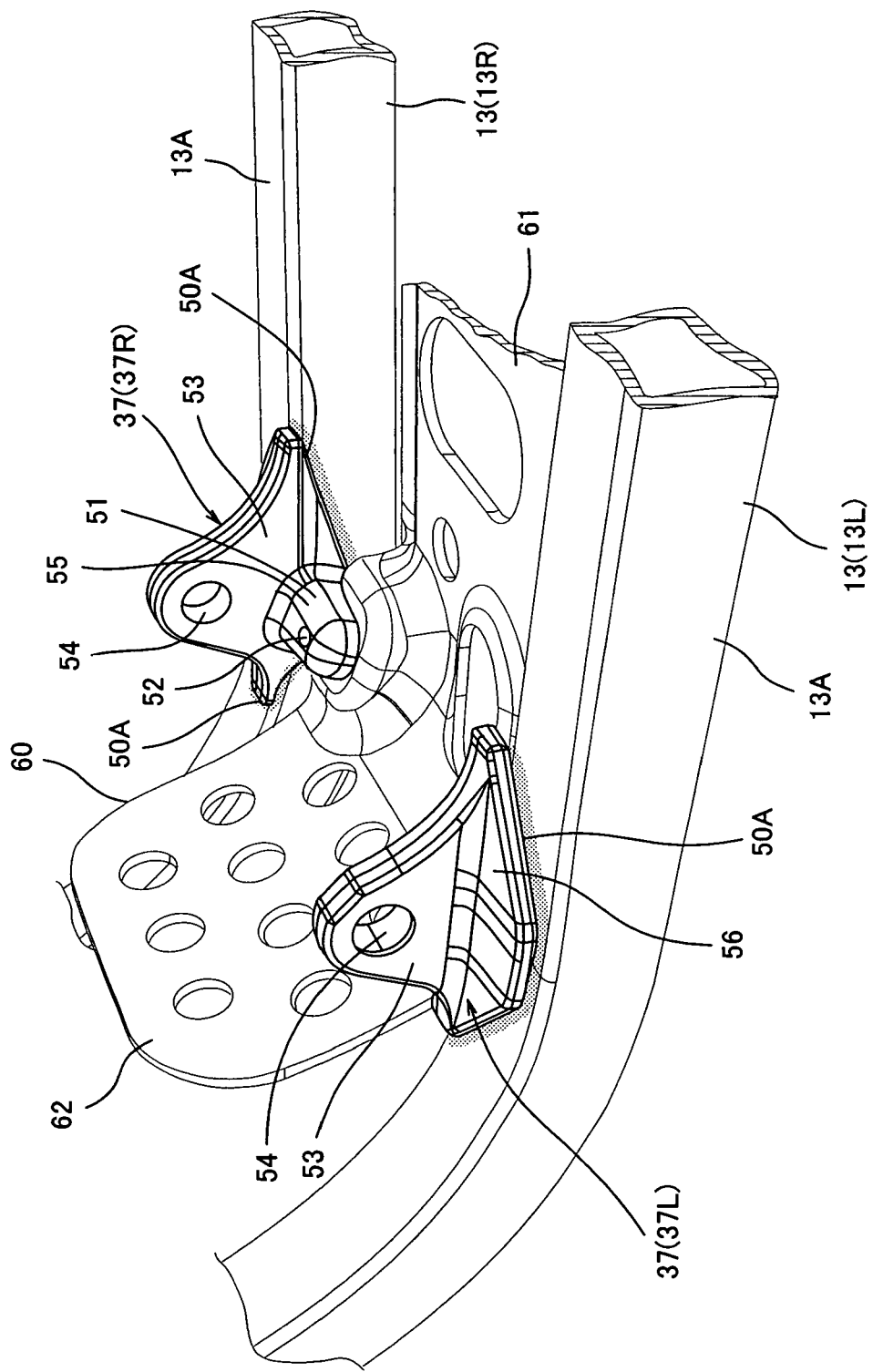
FIG. 5 is a perspective view showing a structure of a region including right and left engine mounting brackets mounted to lower frames of FIG. 2.

As shown in FIGS. 1 and 2, the main frame 11 includes a pair of right and left main frame members 11R and 11L (the left frame member 11L is illustrated in FIGS. 1 and 2, and the right main frame member 11R is illustrated in FIG. 4). A down tube (forming part of a second frame) 12 extends downward and slightly rearward from a lower portion of the head pipe 10. A lower frame (forming part of a second frame) 13 extends from a lower portion of the down tube 12. The lower frame 13 includes a pair of right and left lower frame members 13R and 13L (the left lower frame member 13L is illustrated in FIGS. 1 and 2, and the right lower frame member 13R is illustrated in FIG. 5). The lower frame members 13R and 13L extend substantially downward with a distance between them that increases in a downward direction and then are curved to extend rearward.

A pivot frame (also referred to as a swing arm bracket) 14 is coupled to a rear portion of the lower frame 13 and to a rear portion of the main frame 11. The pivot frame 14 includes a pair of right and left pivot frame members 14R and 14L. The left pivot frame member 14L is coupled to a rear portion of the left main frame member 11L and to a rear portion of the left lower frame member 13L. The right pivot frame member 14R is coupled to a rear portion of the right main frame member 11R and to a rear portion of the right lower frame member 13R. In FIGS. 1 and 2, only the left pivot frame member 14L of the pivot frame 14 is illustrated.

As shown in FIG. 2, a tongue piece 10A for the main frame 11 extends substantially rearward from an upper portion of the head pipe 10 and supports a front portion of the main frame 11 to cover it from above. A tongue piece 10B for the down tube 12 extends substantially downward from a lower portion of the head pipe 10 and supports an upper portion of the down tube 12 to cover it from the front.

As shown in FIG. 2, a pivot hole 14A is formed at a location which is slightly lower than a center in a vertical direction of the left pivot frame member 14L. A swing arm 16 extends substantially forward and rearward and is coupled at a front end portion thereof to be vertically pivotable around a pivot 14B inserted into the pivot hole 14A. As shown in FIG. 1, a rear wheel 5, which is a drive wheel, is rotatably mounted to a rear portion of the swing arm 16.

As shown in FIG. 2, a suspension unit 17 is disposed between an upper portion of the pivot frame 14 and the swing arm 16. The suspension unit 17 is pivotally mounted at an upper portion thereof to a cross member 20 that is mounted between the left pivot frame 14L member and the right pivot frame member 14R by a suspension bracket 21. The suspension unit 17 is configured to apply a force to bias the swing arm 16 downward.

As shown in FIGS. 1 and 2, a gusset 22 and a support bar 23 are mounted between the front portion of the main frame 11 and the rear portion of the down tube 12 to increase strength of the frame 2. The gusset 22 is integral with a radiator mounting bracket 24 to form a unitary piece (see FIG. 2) as described later. A radiator 18 is mounted on the radiator mounting bracket 24 and is positioned in front of the down tube 12.

An engine E is mounted in a space S defined by the head pipe 10, the main frame 11, the down tube 12, the lower frame 13, and the pivot frame 14. The engine E is a four-cylinder four-cycle engine in this embodiment. The engine E includes a crankcase 30, a cylinder block 31, a cylinder head 32, and a cylinder head cover 33 in this order from below.

The engine E is mounted to the frame 2 by a plurality of engine brackets 35, 36, and an engine mounting bracket 37 (see FIG. 2). As shown in FIG. 2, the engine bracket 35 is positioned between an engine mounting bracket 14S formed at a lower portion of an upper end of the pivot frame 14 and an engine mounting boss 14T formed at a lower portion of a rear portion of the cylinder head 32 of the engine E and is configured to couple the bracket 14S and the boss 14T to each other. The engine brackets 35 are provided to correspond to the right and left pivot frame members 14R and 14L, respectively and are configured to support the cylinder head 32 of the engine E from right and left sides (see FIG. 16).

The engine bracket 36 is positioned between an engine mounting bracket 13C formed at a rear portion of an upper end of the lower frame 13 and an engine mounting boss 13D formed at a front portion of an upper portion of the crankcase 30 of the engine E and is configured to couple the bracket 13C and the boss 13D to each other. The engine mounting bracket 37 is positioned between an upper portion at a substantially center in forward and rearward direction of the lower frame 13 and a lower portion of the crankcase 30 of the engine E and is configured to couple the lower frame 13 and the crankcase 30 to each other.

As shown in FIG. 1, an output shaft (not shown) of the engine E is coupled to the rear wheel 5 through a chain C. A drive force of the engine E is transmitted to the rear wheel 5 through the chain C, thereby generating a power to move the motorcycle 1. The drive force of the engine E may alternatively be transmitted to the rear wheel 5 through a belt or through a shaft.

As shown in FIG. 1, a fuel tank 26 is disposed above the main frame 11 and behind the steering shaft 6. A seat 27 which is straddled by the rider is disposed behind the fuel tank 26.

Figure 3:
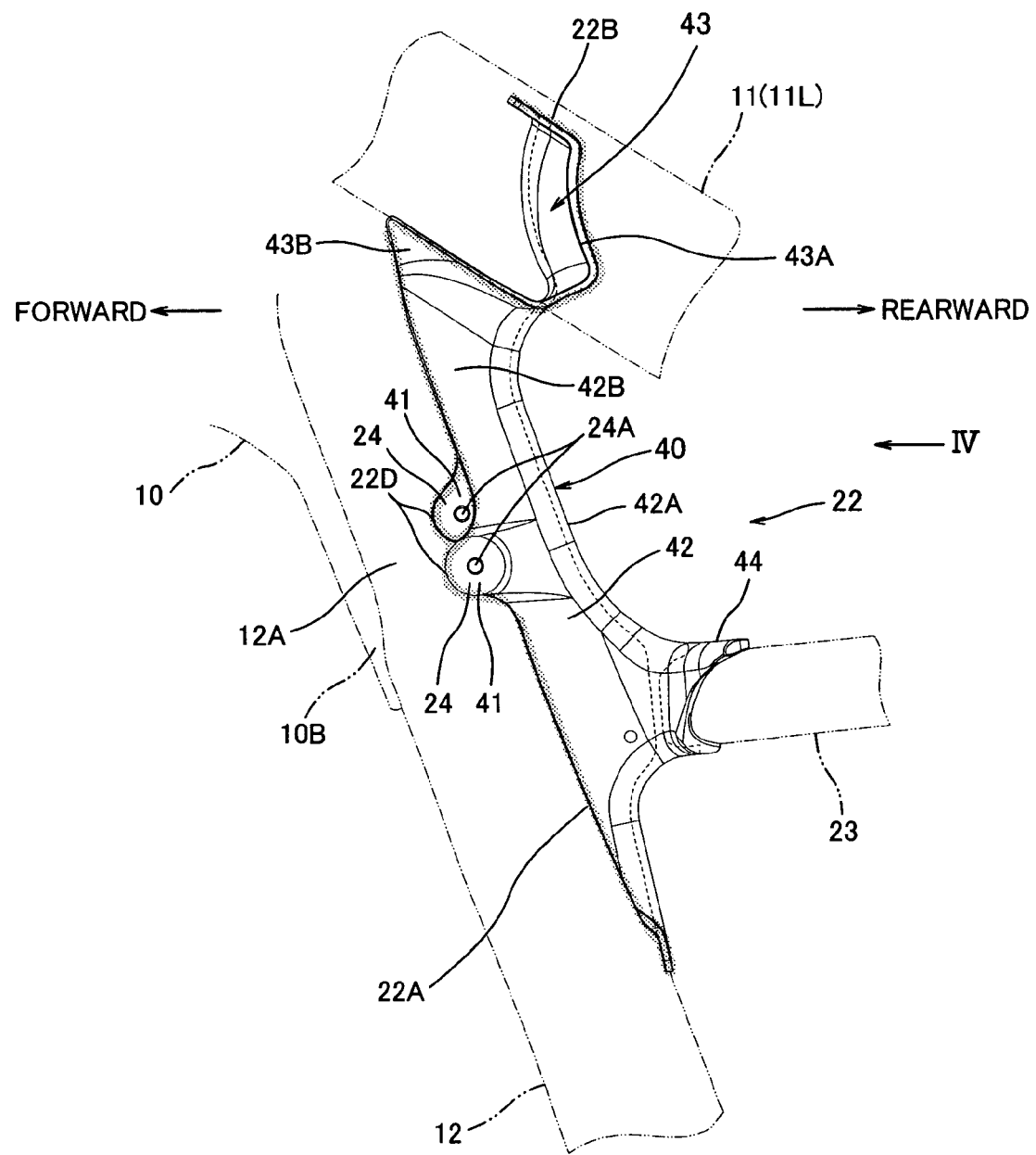
FIG. 3 is a side view showing a structure of a gusset according to the embodiment of the present invention.

A structure of the gusset 22 and a structure of the engine mounting bracket 37 will now be described. FIG. 3 is a side view showing the structure of the gusset 22. FIG. 4 is a rear view of the gusset 22 of FIG. 3, as viewed in a direction of arrow IV in FIG. 3. In FIGS. 3 and 4, the main frame 11 (including frame members 11L or 11R) and the down tube 12 are indicated by two-dotted line.

As shown in FIG. 3, the gusset 22 includes an elongated base portion 40 configured to extend substantially vertically to couple the main frame 11 to the down tube 12, and extending portions 41 configured to extend substantially forward (in a direction perpendicular to the direction in which the base portion 40 extends) from right and left sides of the base portion 40. The base portion 40 includes a down tube connecting portion 42 configured to extend substantially vertically in the longitudinal direction of the down tube 12. The down tube connecting portion 42 covers a rear surface of the down tube 12. The down tube connecting portion 42 is channel-shaped (substantially U-shaped) such that its horizontal cross-section that is substantially sectioned in the direction perpendicular to the longitudinal direction opens forward. The down tube connecting portion 42 has a width substantially equal to a width of an upper portion of the down tube 12. The gusset 22 is coupled to the down tube 12 in such a manner that a region 22A extending along a front peripheral region of each of right and left side walls 42B of the down tube connecting portion 42 is welded to an outer wall of the down tube 12.

The base portion 40 further includes a main frame connecting portion 43 that is located above the down tube connecting portion 42 and is configured to be coupled to the main frame 11. The main frame connecting portion 43 includes an inner connecting portion 43A extending in a claw shape from an upper portion of a rear wall 42A (see FIG. 4) of the down tube connecting portion 42, and a triangular lower connecting portion 43B extending from an upper portion of each of right and left side walls 42B of the down tube connecting portion 42. As shown in FIG. 4, the inner connecting portion 43A has a width slightly larger than a width of the down tube connecting portion 42.

As shown in FIGS. 3 and 4, a front portion of each of the right and left main frame members 11R and 11L configured to extend rearward with a distance between them that increases in a rearward direction is coupled to the main frame connecting portion 43. The left main frame member 11L extends rearward and leftward from forward of the gusset 22. An outer wall of the front portion of the main tube (left main frame member 11L) that is closer to a center in the width direction is supported by a left region of the inner connecting portion 43A of the main frame connecting portion 43, and an outer wall located thereunder is supported by the lower connecting portion 43B of the main frame connecting portion 43. Under this condition, a region 22B of the gusset 22 extending along a peripheral region of the main frame connecting portion 43 is welded to the outer wall of the left main frame member 11L so that the gusset 22 is coupled to the left main frame member 11L.

The gusset 22 is coupled to the right main frame member 11R in the same manner. To be specific, the right main frame member 11R extends rearward and rightward from forward of the gusset 22. An outer wall of a front portion of the right main frame member 11R that is closer to a center in the width direction is supported by a right region of the inner connecting portion 43A of the main frame connecting portion 43, and an outer wall located thereunder is supported by the lower connecting portion 43B of the main frame connecting portion 43. Under this condition, a region 22C (see FIG. 4) of the gusset 22 extending along the peripheral region of the main frame connecting portion 43 is welded to the outer wall of the right main frame member 11R so that the gusset 22 is coupled to the right main frame member 11R.

A bar mounting portion 44 to which the support bar 23 is mounted is attached at a location slightly lower than the center in the longitudinal direction of the down tube connecting potion 42 of the gusset 22. The bar mounting portion 44 extends rightward and leftward (laterally) at a rear portion of the down tube connecting portion 42. A vertical cross-section (cross-section sectioned in the direction perpendicular to the longitudinal direction) of the bar mounting portion 44 is channel-shaped (substantially U-shaped) to open rearward. The support bar 23 is substantially U-shaped to open rearward as viewed from above and a center region 23A of the support bar 23 is fitted to the bar mounting portion 44. As shown in FIG. 2, each of right and left end portions 23B extends rearward from the center region 23A and is coupled to a lower face of the rear portion of the corresponding main frame member 11L or 11R. The support bar 23 is coupled to the bar mounting portion 44 and to the main frame 11 in such a manner its peripheral region is welded to the corresponding region of the bar mounting portion 44 and the main frame 11.

As shown in FIG. 3, the extending portion 41 extends (or protrudes) forward from an intermediate position in the longitudinal direction of each of the right and left side walls 42B of the down tube connecting portion 42. The extending portion 41 is provided with a radiator mounting bracket 24 having a penetrating hole 24A extending therethrough rightward and leftward (laterally). A bolt (not shown) is inserted into the penetrating hole 24A to allow the radiator 18 (see FIG. 2) to be mounted to the radiator mounting bracket 24. The gusset 22 of this embodiment is manufactured by forging or by casting; The radiator mounting bracket 24 is manufactured integrally with the gusset 22 to form a unitary piece. A region 22D of the gusset 22 extending along a peripheral region of the radiator mounting bracket 24 is welded to an outer wall of the down tube 12.

As described above, since the radiator mounting bracket 24 is integral with the gusset 22 to form a unitary piece, the number of components decreases and welding work becomes less burdensome in contrast to a case where the gusset 22 and the radiator mounting bracket 24 are separately manufactured and are individually welded to the down tube 12. In addition, since the gusset 22 and the radiator mounting bracket 24 are manufactured integrally by forging or by casting, the radiator mounting bracket 24 is positioned with respect to the gusset 22 with accuracy. As a result, the radiator 18 is mounted to the radiator mounting bracket 24 with higher positioning accuracy.

In this embodiment, since the upper portion of the down tube is sandwiched from the front and rear by the down tube tongue piece 10B of the head pipe 10 and the gusset 22, an area of an exposed region 12A (see FIG. 3) of the down tube 12 which is between the down tube tongue piece 10B and the gusset 22 is small. Welding of an independent radiator mounting bracket to the small exposed region 12A described above is complicated. The gusset 22 of this embodiment advantageously makes it possible to omit such a process.

A structure of the engine mounting bracket 37 will be described. As shown in FIG. 2, the lower frame 13 extends downward from the lower end portion of the down tube 12 and then is curved to extend rearward substantially horizontally. The engine mounting bracket 37 is disposed on a front portion of a horizontal portion 13A of the lower frame 13.

FIG. 5 is a perspective view showing a structure of a region including the engine mounting bracket 37 mounted to the lower frame 13. As shown in FIG. 5, the engine mounting bracket 37 includes a left engine mounting bracket 37L and a right engine mounting bracket 37R which are disposed on the left lower frame member 13L and the right lower frame member 13R, respectively. An engine guard 60 is disposed between the right and left lower frame members 13R and 13L and is configured to cover the engine E from below.

The engine guard 60 is formed of a plate having a plurality of punch holes to reduce weight. The engine guard 60 includes a lower cover portion 61 that is configured to extend forward and rearward along the horizontal portions 13A of the right and left lower frame members 13R and 13L and to cover the engine E from below, and a front cover portion 62 that is configured to extend upward from a front portion of the lower cover portion 61 and to cover a front portion of a lower portion of the engine E. The engine guard 60 is mounted at a front position of the lower cover portion 61 to the right and left lower frame members 13R and 13L by the right and left engine brackets 37R and 37L, respectively.

Figure 6:
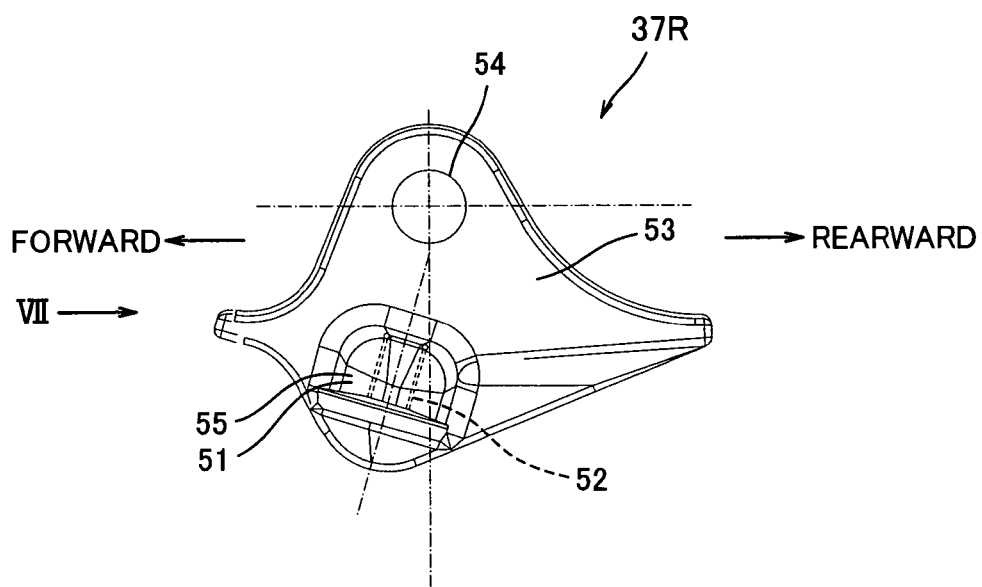
FIG. 6 is a side view of the right engine mounting bracket of FIG. 5.
Figure 7:
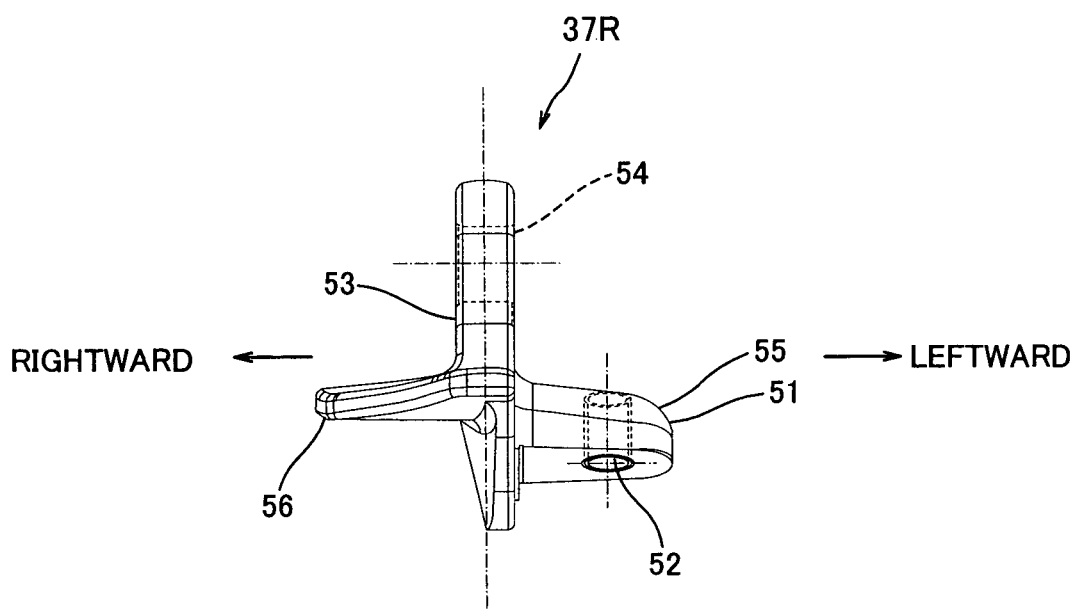
FIG. 7 is a front view of the engine mounting bracket of FIG. 6 as viewed in a direction of arrow VII in FIG. 6.

FIG. 6 is a side view of the right engine mounting bracket 37R of FIG. 5. FIG. 7 is a front view of the right engine mounting bracket 37R as viewed in a direction of arrow VII in FIG. 6. As shown in FIG. 6, the engine mounting bracket 37R has a base portion 53 that is of a plate shape with a relatively large wall thickness and is substantially lozenge-shaped in a side view. The base portion 53 extends vertically with a normal line oriented rightward and leftward (laterally). The base portion 53 is provided at an upper region thereof with a penetrating hole 54 extending rightward and leftward (laterally). The engine E (see FIG. 2) is fastened to the engine mounting bracket 37R by a fastener bolt (not shown) inserted into the penetrating hole 54.

A protrusion 55 with a large wall thickness extends to the left, (i.e. toward the center in the width direction of the vehicle body) from a lower region of the base portion 53 of the engine mounting bracket 37R. The protrusion 55 is manufactured integrally with the base portion 53 by forging or by casting. The protrusion 55 forms a guard mounting member 51 to which the engine guard 60 is mounted. As shown in FIGS. 6 and 7, the guard mounting member 51 has a rectangular cross-section with rounded corners in an upper region thereof when sectioned along a plane (vertical plane along the longitudinal direction of the vehicle body) parallel to the base portion 53, and has stiffness sufficient to support the engine guard 60. The guard mounting member 51 is provided with a penetrating hole 52 extending substantially vertically in the vicinity of a tip end thereof. The engine guard 60 is mounted to the guard mounting member 51 by a fastener bolt (not shown) inserted into the penetrating hole 52.

As shown in FIG. 7, a plate-shaped extending portion 56 having a substantially horizontal face extends in an opposite direction to the protrusion 55 from a location slightly lower than the center in the vertical direction of the base portion 53 of the engine mounting bracket 37R. The extending portion 56 is manufactured integrally with the base portion 53 to form a unitary piece by forging or by casting. The extending portion 56 has a lower face conforming in shape to an upper face of a region of the lower frame member 13R at which the extending portion 56 is connected to the lower frame member 13R.

As shown in FIG. 5, the right engine mounting bracket 37R is disposed on an upper region of the horizontal portion 13A of the right lower frame member 13R. More specifically, the right engine mounting bracket 37R is disposed on the right lower frame member 13R in such a manner that an outer face (right side face) of a lower portion of the base portion 53 extending vertically is in contact with an inner face (left side face) of the right lower frame member 13R and a lower face of the extending portion 56 is in contact with an upper face of the lower frame member 13R. The right engine mounting bracket 37R is coupled to the right lower frame member 13R in such a manner that a region 50A along a peripheral region of a lower portion of the base portion 53 and a peripheral region of the extending portion 56 is welded to the inner face and the upper face of the right lower frame 13R. An upper portion of the base portion 53 having the penetrating hole 54 for allowing the engine E to be fastened thereto by the fastener bolt protrudes upward from the right lower frame member 13R and the guard mounting member 51 having the penetrating hole 52 for allowing the engine guard 60 to be threadedly fastened thereto protrudes inward in the width direction of the vehicle body.

The left engine mounting bracket 37L is substantially symmetric to the right engine mounting bracket 37R, and therefore its structure will not be further described. The left engine mounting bracket 37L is coupled to the left lower frame member 13L in the same manner that the right engine mounting bracket 37R is coupled to the right lower frame member 13R, which will not be further described, either.

Since the right and left engine mounting brackets 37R and 37L are integral with the guard mounting members 51 to form a unitary piece, the number of components decreases, and welding work becomes less burdensome in contrast to a case where the right and left engine mounting brackets 37R and 37L and the guard mounting members 51 are manufactured separately and are individually welded to the right and left lower frame members 13R and 13L, respectively. In addition, since the engine mounting brackets 37R and 37L are manufactured integrally with the guard mounting members 51 by casting or by forging, the guard mounting members 51 are positioned with respect to the right and left engine mounting brackets 37R and 37L with accuracy. As a result, the engine guard 60 is mounted to the engine E with higher positioning accuracy.

Since the guard mounting members 51 integral with the engine mounting brackets 37L and 37R have rectangular-cross sections and have a relatively large wall thickness, they have sufficient stiffness. During travel of the motocross motorcycle 1, the stiff guard mounting members 51 are highly resistant to an impact applied externally to the engine guard 60.

The present invention is applicable to cruising and touring type motorcycles and road racer motorcycles as well as to the above mentioned motocross motorcycles. In addition, the present invention is applicable to a frame including a single main frame member, a frame including two down tubes, or a frame including a single lower frame member as well.

Figure 8:
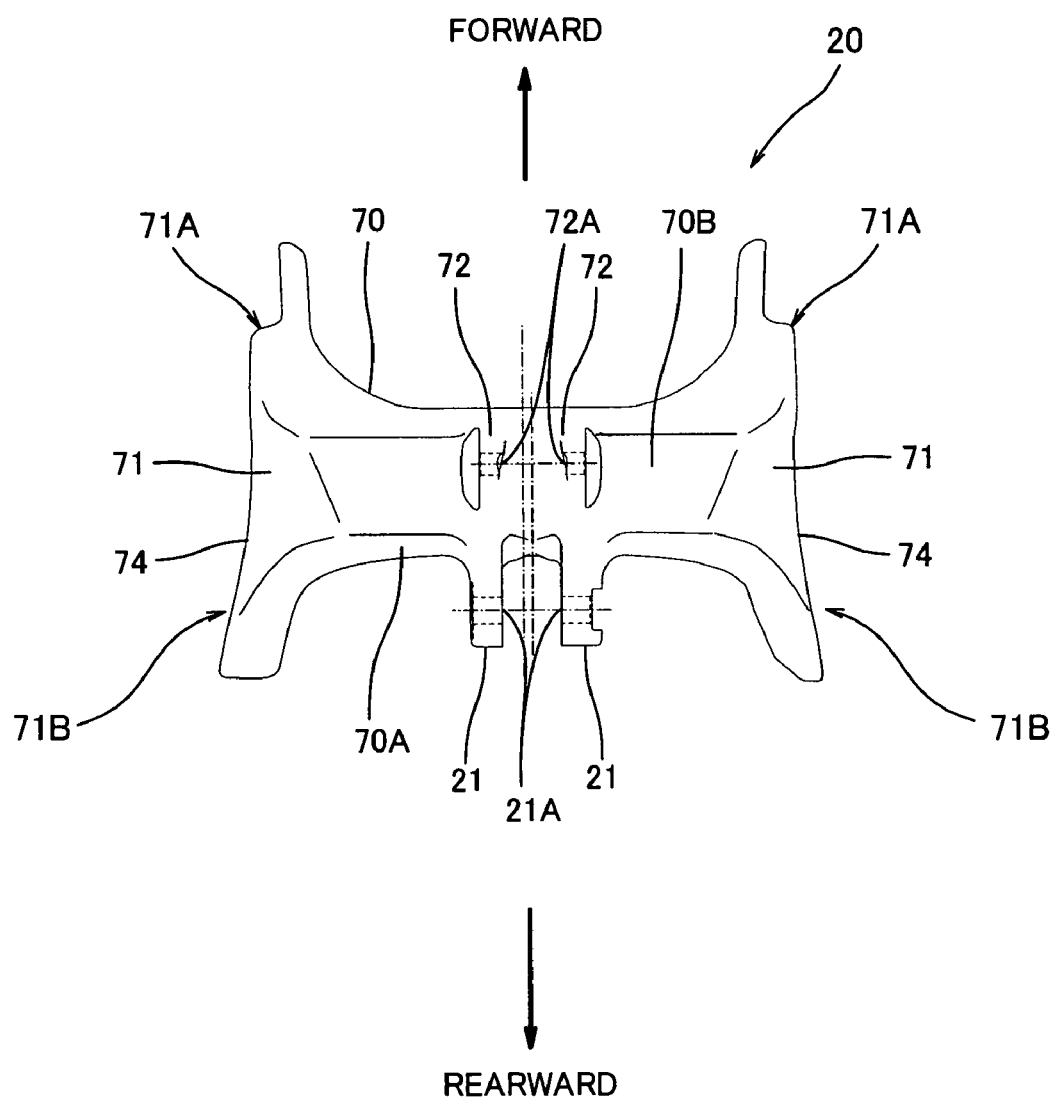
FIG. 8 is a plan view of a cross member of FIG. 2.
Figure 9:
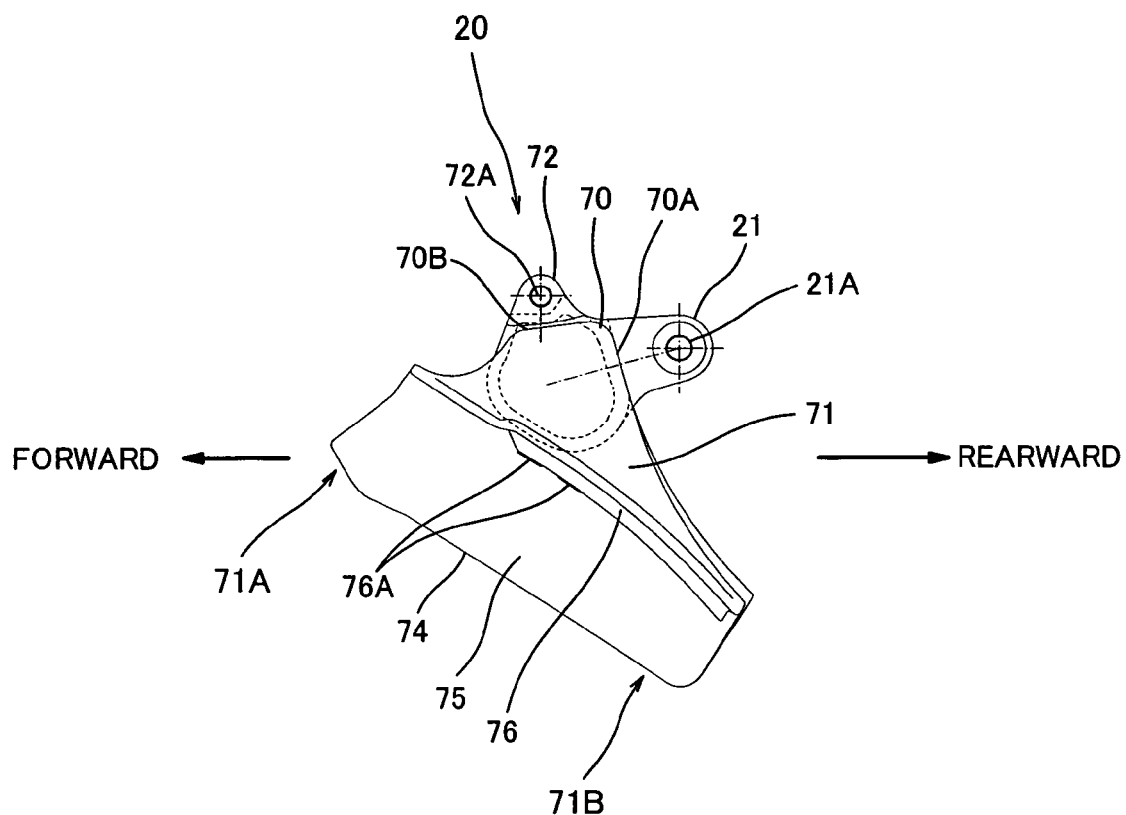
FIG. 9 is a side view of the cross member of FIG. 8.
Figure 10:
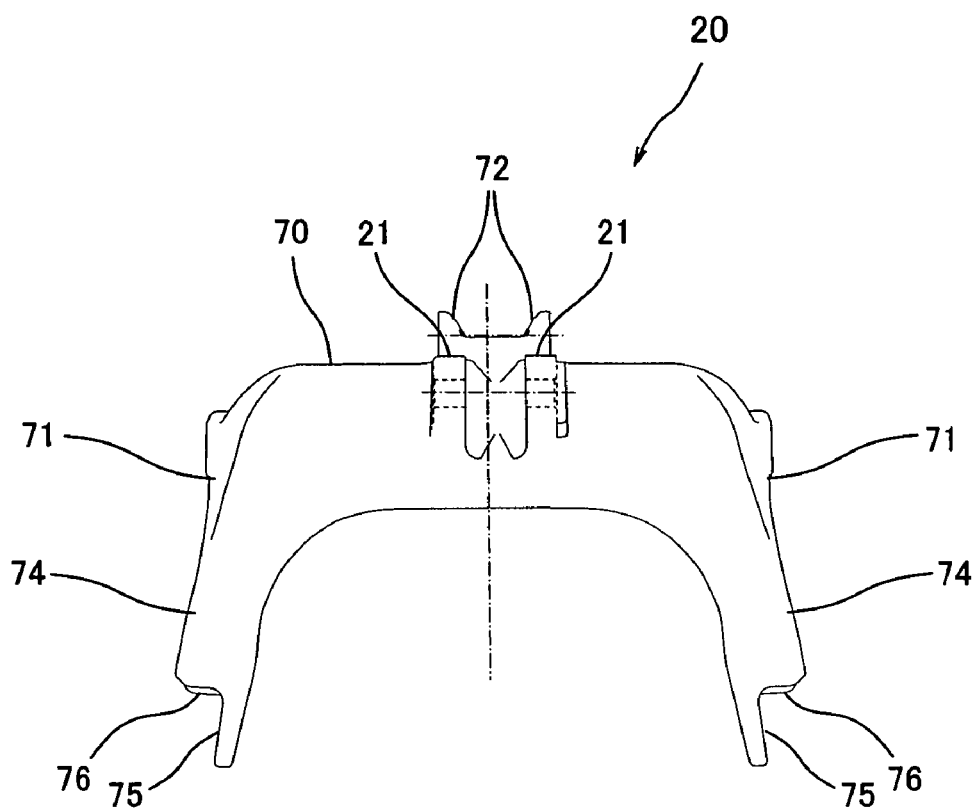
FIG. 10 is a rear view of the cross member of FIG. 8.
Figure 11:
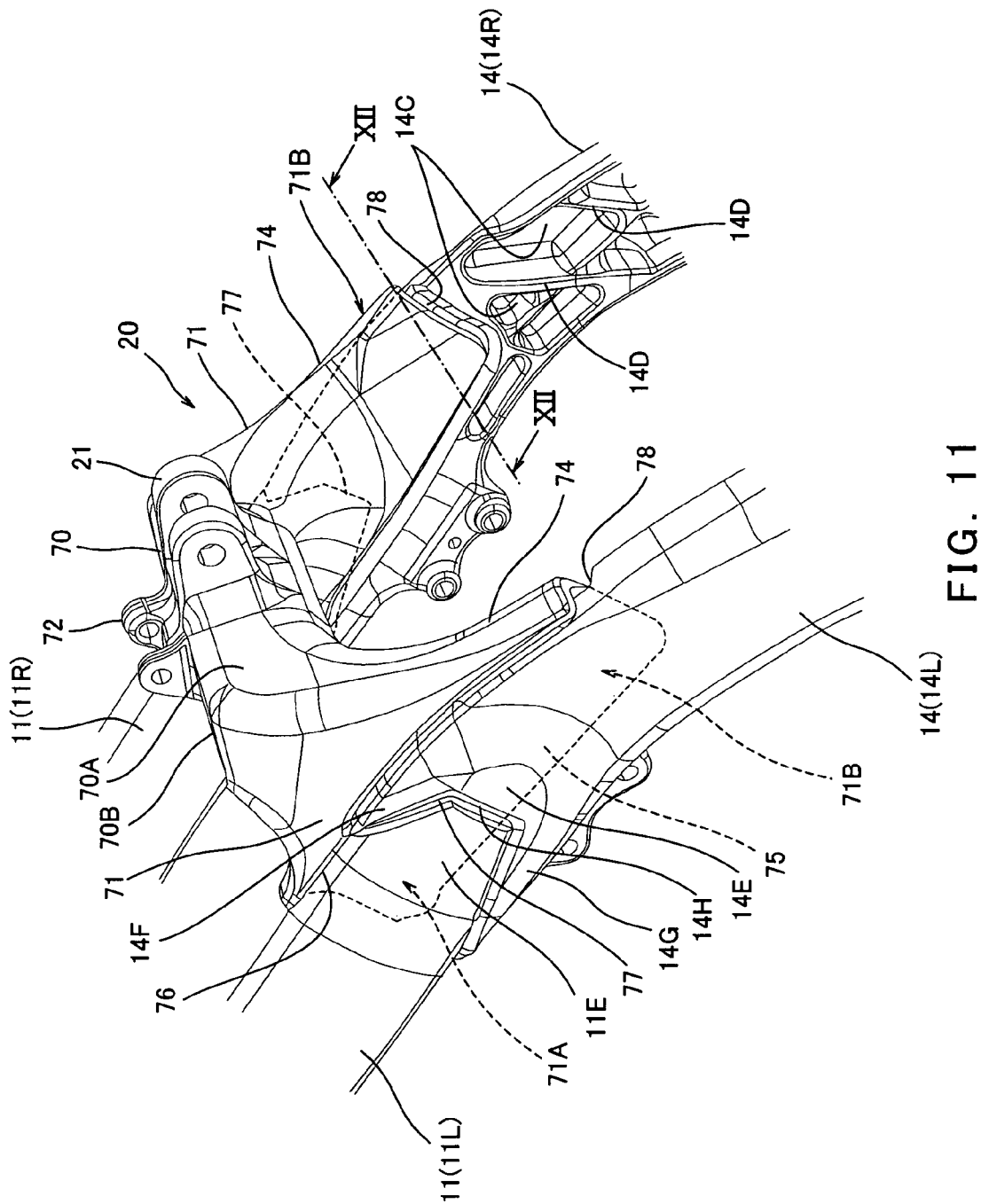
FIG. 11 is a perspective view showing a connecting configuration of main frames, pivot frames, and a cross member of FIG. 2.

A structure of the cross member 20, and a connecting configuration of the main frame 11, the pivot frame 14 and the cross member 20 will be described. FIG. 8 is a plan view of the cross member 20 of FIG. 2. FIG. 9 is a side view of the cross member 20 of FIG. 8. FIG. 10 is a rear view of the cross member 20. FIG. 11 is a perspective view showing a connecting configuration of the main frame 11, the pivot frame 14, and the cross member 20.

As shown in FIG. 8, the cross member 20 includes a cross portion 70 extending rightward and leftward (laterally) and cross member connecting portions 71 provided at both ends of the cross portion 70, and is manufactured integrally by casting. As indicated by a broken line in the side view of FIG. 9, the cross portion 70 is of a hollow tubular shape and has a rear side wall 70A at a rear outer peripheral region thereof and an upper side wall 70B at an upper outer peripheral region thereof. The rear side wall 70A forms a substantially vertical wall face with a normal line oriented substantially rearward. The upper side wall 70B forms a substantially horizontal wall face with a normal line oriented substantially upward. The rear side wall 70A and the upper side wall 70B extend over substantially the entire length in a rightward and leftward (lateral) direction of the cross portion 70. As described later, holes 76A are formed on an upper connecting face 76 (see FIG. 9) of the cross member connecting portion 71 extending downward from each of right and left end portions of the cross portion 70 and are configured to communicate with an inner space of the cross portion 70 to discharge a core of sand that may fill in the inner space during the casting process. The cross portion 70 is of a hollow tube shape with a substantially closed peripheral region as illustrated in FIG. 9, but may alternatively be of a hollow tube shape with an open lower portion. In a further alternative, ribs may be suitably provided on the cross portion 70 to increase strength.

As shown in FIGS. 8 and 9, a pair of right and left suspension brackets 21 protrude rearward from the rear side wall 70A at a center in rightward and leftward (lateral) direction of the cross portion 70. The suspension unit 17 (see FIG. 2) is pivotally mounted at an upper portion thereof to the suspension brackets 21. The right and left suspension brackets 21 extend in parallel to be spaced a predetermined distance from each other. Penetrating holes 21A are formed on rear portions of the suspension brackets 21 in such a manner that their center axes conform to each other. Support pins (not shown) are inserted into the penetrating holes 21A.

As shown in FIGS. 8 and 9, a pair of right and left rail brackets 72 protrude upward from the upper side wall 70B. The rail brackets 72 are located forward relative to the suspension brackets 21 and at a substantially center in rightward and leftward (lateral) direction of the cross portion 70. Seat rails (not shown) are mounted to the rail brackets 72. The right and left rail brackets 72 are arranged in parallel to be spaced apart from each other. Penetrating holes 72A are formed on upper regions of the rail brackets 72 in such a manner that their center axes conform to each other. Support pins (not shown) are inserted into the penetrating holes 72A.

The suspension brackets 21 and the rail brackets 72 are manufactured integrally with the cross member 20 by casting. This improves firm connection between these elements and dimension precision in contrast to a case where the suspension brackets 21 and the rail brackets 72 are separately manufactured and welded. It shall be appreciated that one or more of the cross member 20, the suspension brackets 21, and the rail brackets 72 need not be formed by casting (e.g., die casting) but may be formed by, for example, forging or pressing.

As shown in FIG. 10, the cross member connecting portions 71 extend downward from right and left end portions of the cross portion 70. When viewed from the rear, the right and left cross member connecting portions 71 extend downward such that a distance between them gradually increases in a downward direction, and a connecting portion of the cross portion 70 to each of the cross member connecting portions 71 is circular-arc shaped. As shown in FIGS. 8 and 9, an extending portion 74 is formed at a lower region of each cross member connecting portion 71 so as to extend rearward and downward from a forward and upward location. As shown in FIG. 8, as viewed from above, a region of the cross member 20 extending from an end region of the cross portion 70 to a front region and a rear region of the extending portion 74 has a circular-arc outer shape. As shown in FIG. 9, as viewed from the side, a region of the cross member 20 extending from an upper region of the cross member connecting portion 71 to a front region and a rear region of the extending portion 74 has a circular-arc outer shape. Since the connecting region of these portions of the cross member 20 is of a circular-arc outer shape, the load applied to the cross portion 70 is efficiently transmitted to the extending portion 74 of the cross member connecting portion 71.

The extending portion 74 has an inner connecting face 75 extending along the longitudinal direction of the extending portion 74 to form a substantially vertical face and an upper connecting face 76 extending outward in the rightward and leftward (lateral) direction of the cross member 20 from an upper region of the inner connecting face 75. As shown in FIG. 11, the inner connecting face 75 extends along an inner face of a rear region of the main frame 11 and an inner face of an upper region of the pivot frame 14 and along the longitudinal direction of the frames 11 and 14 at a region surrounding a connecting portion (hereinafter referred to as a frame connecting portion) 77 of the main frame 11 and the pivot frame 14. The upper connecting face 76 extends along an upper face of the rear region of the main frame 11 and an upper face of the upper region of the pivot frame 14 and along the longitudinal direction of the frames 11 and 14 at a region surrounding the frame connecting portion 77 of the main frame 11 and the pivot frame 14. As shown in FIG. 9, the holes 76A are formed at substantially the center in the longitudinal direction of the upper connecting face 76 to discharge a core of sand that may fill in the cross portion 70 during casting.

As shown in FIG. 11, in the cross member 20, the extending portion 74 of the cross member connecting portion 71 has a front connecting portion 71A that extends forward along the main frame 11 and is connected to the main frame 11 and a lower connecting portion 71B that extends downward along the pivot frame 14 and is connected to the pivot frame 14. Further, a region between the front connecting portion 71A and the lower connecting portion 71B is connected to the frame connecting portion 77 of the main frame 11 and the pivot frame 14.

As shown in FIG. 11, an upper end portion 14E of the pivot frame 14 is configured to be cut out in substantially U-shape to open forward in a side view. A rear end portion 11E of the main frame 11 is configured to conform in shape to the upper end portion 14E of the pivot frame 14. In other words, the rear end portion 11E of the main frame 11 is configured to be cut out to form a substantially trapezoidal shape. The upper end portion 14E of the pivot frame 14 is formed such that a center region in the vertical direction is cut out in substantially trapezoidal shape to conform to the shape of the rear end portion 11E of the main frame 11, thereby forming upper and lower pointed ends 14F and 14G at upper and lower regions of the upper end portion 14E. The upper end portion 14E of the pivot frame 14 has an end face 14H that is located between the upper and lower pointed ends 14F and 14G to extend in a direction substantially perpendicular to the longitudinal direction of the pivot frame 14. The main frame 11 and the pivot frame 14 are coupled to each other in such a manner that the rear end portion 11E of the main frame 11 and the upper end portion 14E of the pivot frame 14 are butted against each other, and a butted region is welded. Thus, the main frame 11 and the pivot frame 14 are coupled to each other with a long weld length, thereby improving coupling strength of the frames 11 and 14. Concave portions 14C are formed on inner regions of upper portions of the pivot frames 14, i.e., opposite side walls of the right and left pivot frame members 14R and 14L. A number of ribs 14D are provided within the concave portions 14.

The above mentioned cross member 20 is mounted between the right and left frame connecting portions 77 of the main frames 11 and the pivot frames 14. As shown in FIG. 11, the cross member 20 is mounted from above between the right and left frame connecting portions 77 such that the longitudinal direction of the cross portion 70 corresponds with the rightward and leftward (lateral) direction. The right and left inner connecting faces 75 of the cross member connecting portions 71 are configured to contact the right and left connecting portions 77 from inward in the rightward and leftward (lateral) direction of the vehicle body. The upper connecting faces 76 of the cross member connecting portions 71 are configured to contact the frame connecting portions 77 from above.

The inner connecting face 75 and the upper connecting face 76 of each cross member connecting portion 71 cover inner regions and upper regions of each frame connecting portion 77 between the frames 11 and 14, the rear end portion 11E of each main frame 11, and the upper end portion 14E of each pivot frame 14. Under this condition, an outer peripheral region of the inner connecting face 75 of the cross member connecting portion 71 and an outer peripheral region of the upper connecting portion 76 of the cross member connecting portion 71 are welded to the outer wall of the main frame 11, and the outer wall of the pivot frame 14 so that the cross member 20, the main frame 11, and the pivot frame 14 are firmly coupled to each other.

Figure 12:
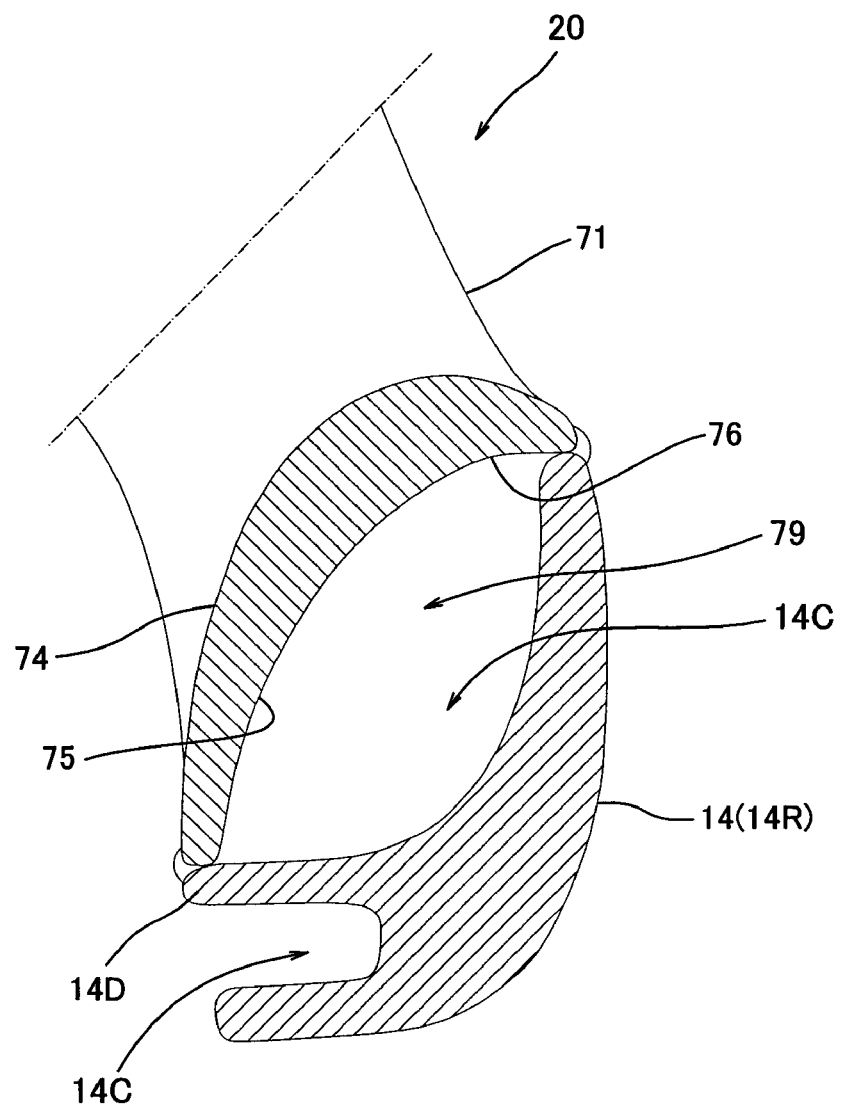
FIG. 12 is a cross-sectional view taken along line XII-XII in FIG. 11.

As shown in FIG. 12, which is a cross-sectional view taken along line XII-XII in FIG. 11, the concave portion 14C formed on the upper region of the pivot frame 14 and the cross member connecting portion 71 of the cross member 20 that covers the concave portion 14C form a hollow structure having an inner space 79, which is able to ensure strength. Therefore, the ribs 14D may be omitted in the interior of the concave portion 14C covered with the cross member connecting portion 71, as illustrated in this embodiment.

As shown in FIG. 11, a recess 78 is formed in a region of the main frame 11 and the pivot frame 14 which is configured to contact the cross member connecting portion 71 of the cross member 20. The cross member 20 is mounted between the main frame 11 and the pivot frame 14 in such a manner that the cross member connecting portion 71 is fitted into the recess 78. Thus, the cross member 20 is easily positioned with respect to the main frame 11 and the pivot frame 14.

In accordance with the frame 2 constructed above, the cross member 20, the main frames 11, and the pivot frames 14 are firmly coupled to each other, and the load applied to the cross member 20 through the suspension brackets 21 is efficiently transmitted and dispersed from the extending portions 74 of the cross member connecting portions 71 of the cross member 20 to the main frames 11 and the pivot frames 14.

The frame of the present invention is applicable to cruising and touring type motorcycles and road racer motorcycle as well as to the above mentioned motocross motorcycles.

Figure 13:
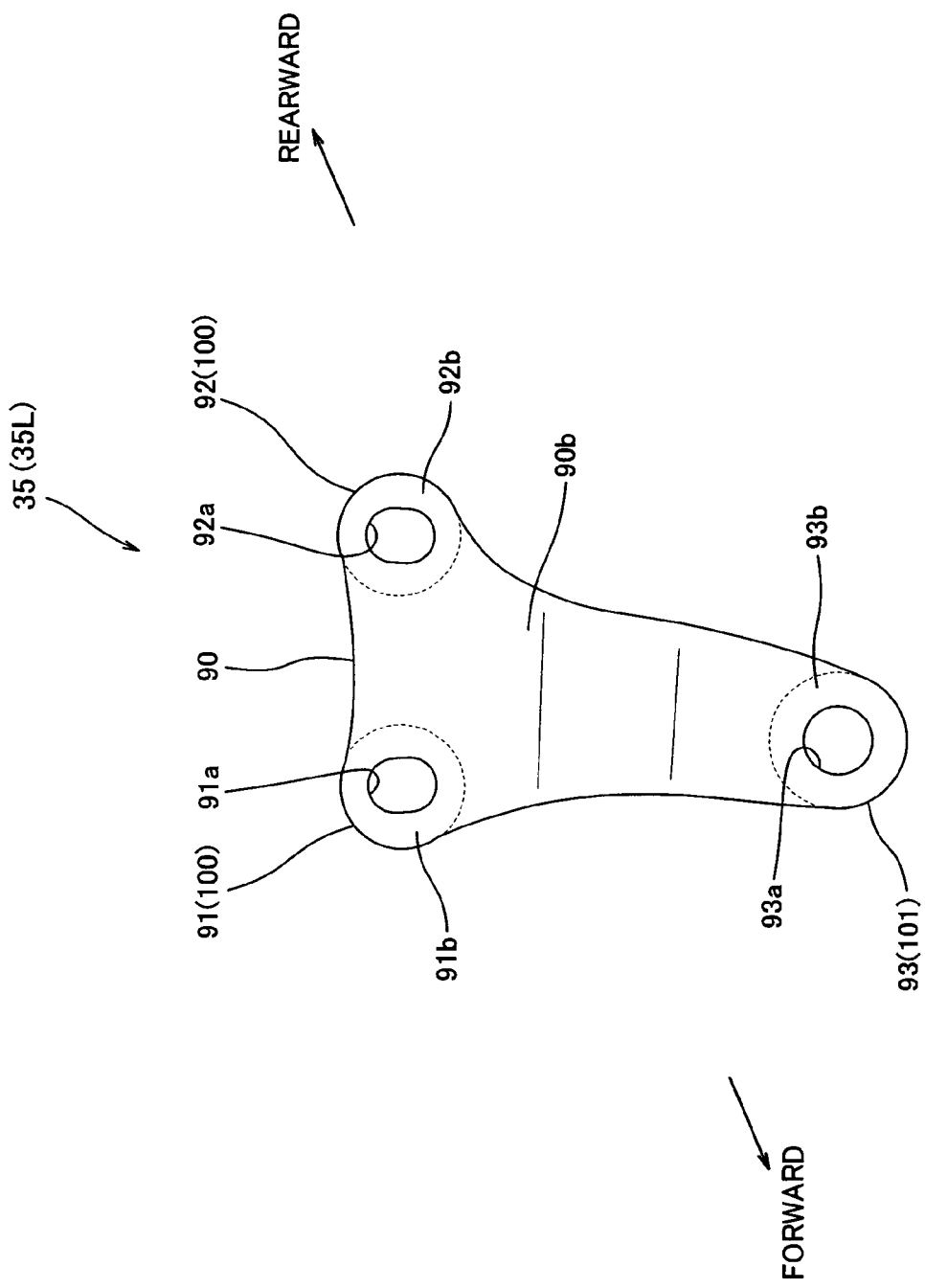
FIG. 13 is a side view of a left engine bracket by which a cylinder head of the engine of FIG. 2 is coupled to the pivot frame of FIG. 2, as viewed from outside (left side) in a rightward and leftward (lateral) direction of a vehicle body of the motorcycle.
Figure 14:
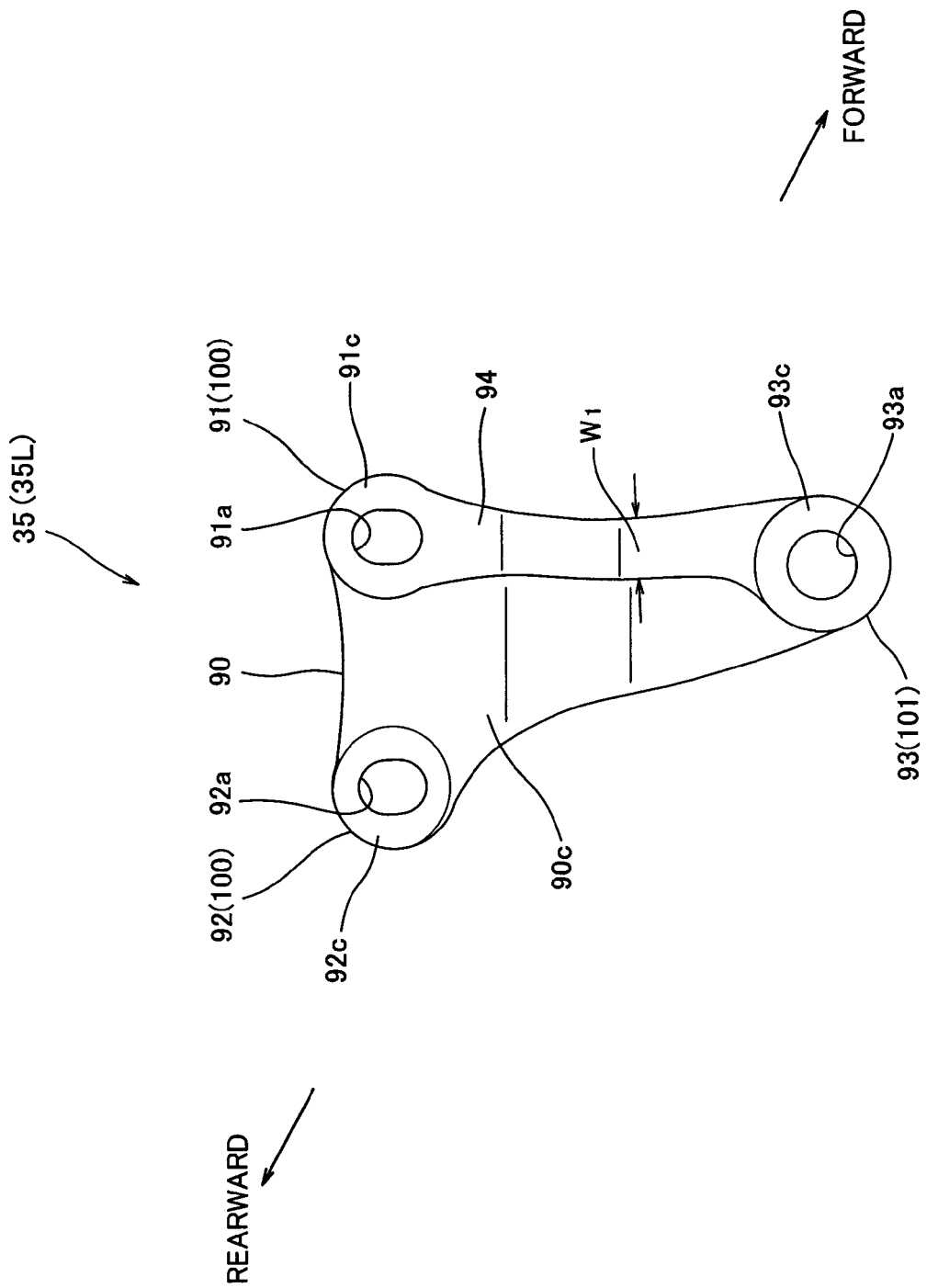
FIG. 14 is a side view showing a structure of the engine bracket of FIG. 13, as viewed from inward in the rightward and leftward (lateral) direction of the vehicle body.
Figure 15:
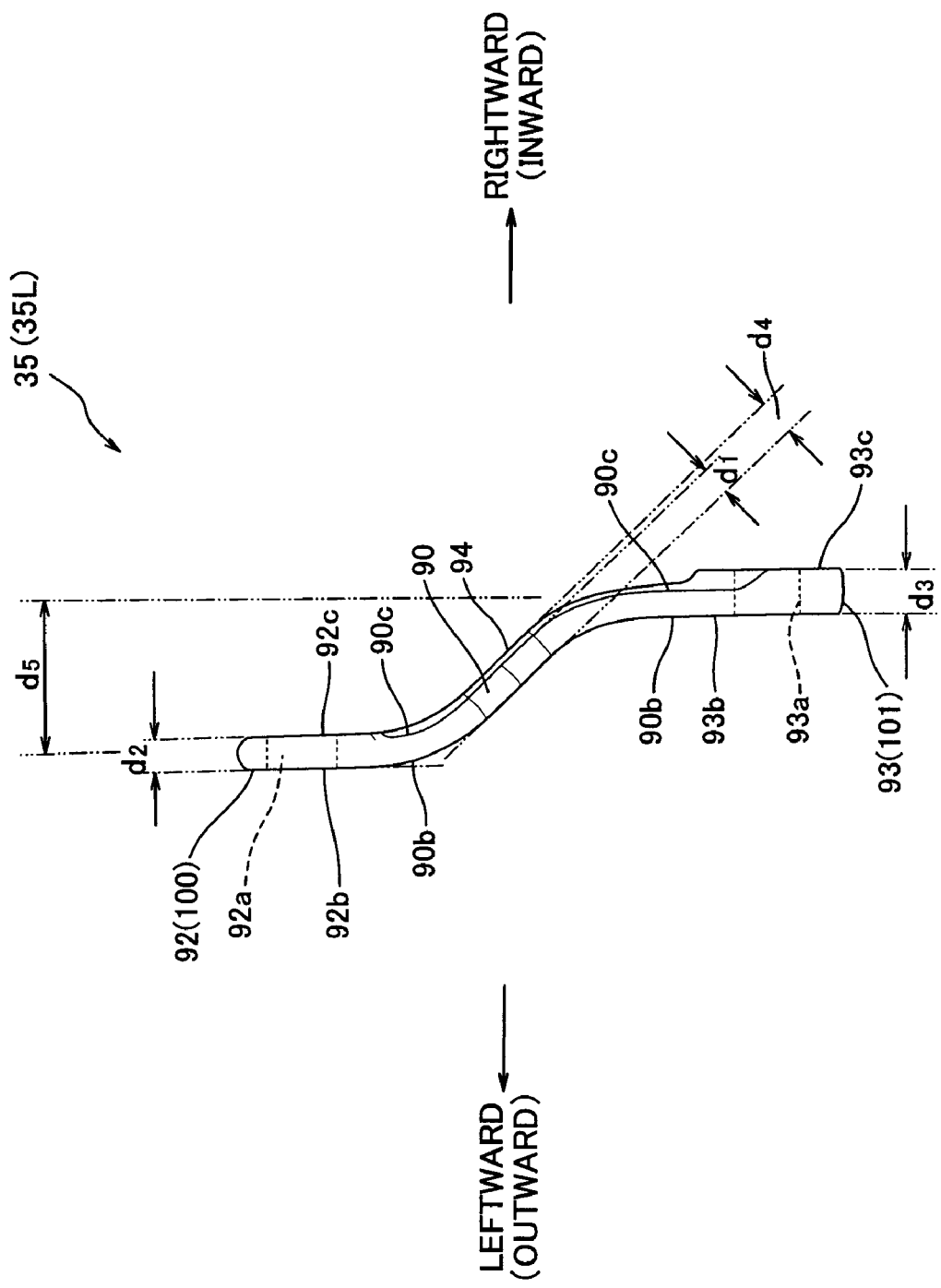
FIG. 15 is a rear view showing a structure of the engine bracket of FIG. 13, as viewed from rearward of the vehicle body.

A structure of the engine bracket 35 will be described. FIG. 13 is a side view showing the left engine bracket 35L by which the pivot frame 14 is coupled to the cylinder head 32 of the engine E, as viewed from outward (the left side) in the rightward and leftward (lateral) direction of the motorcycle 1. FIG. 14 is a side view showing a structure of the engine bracket 35L as viewed from inward in the rightward and leftward (lateral) direction of the vehicle body of the motorcycle 1. FIG. 15 is a rear view showing a structure of the engine bracket 35L as viewed from rearward of the vehicle body. The right and left brackets 35R and 35L are manufactured from aluminum alloy by forging, and are shaped to have suitable strength, stiffness, and weight as described later.

As shown in FIG. 13, the left engine bracket 35L has a base plate 90 that is inverted-triangle shaped in a side view and has a predetermined thickness $d_1$ (see FIG. 15). Front and rear hole portions 91 and 92 are formed on an upper region of the base plate 90. The bolt hole portions 91 and 92 form frame side connecting portions 100 which are configured to be fastened to the engine mounting bracket 14S (see FIG. 2) of the left pivot frame 14L. As shown in FIG. 14, the bolt hole portions 91 and 92 are of a circle shape. Bolt holes 91a and 92a are formed at the bolt hole portions 91 and 92 to extend therethrough in a thickness direction of the base plate 90. The bolt holes 91a and 92a have elongate circle (substantially oval) cross-sections.

As shown in FIG. 15, the bolt hole portion 92 has a thickness $d_2$ slightly larger than the thickness $d_1$ of the base plate 90 and protrudes inward (rightward) of the vehicle body from an inner face 90c of the base plate 90. An outer face 92b of the bolt hole portion 92 is flush with an outer face 90b of the base plate 90, and an inner face 92c of the bolt hole portion 92 is located inward of the vehicle body relative to the inner face 90c of the base plate 90. Although not shown in FIG. 15, the bolt hole portion 91 has the thickness $d_2$ and protrudes inward of the vehicle body from the inner face 90c of the base plate 90 as in the bolt hole portion 92. The outer face 91b of the bolt hole portion 91 in FIG. 13 is flush with the outer face 90b of the base plate 90, and the inner face 91c of the bolt hole portion 91 in FIG. 14 is located inward of the vehicle body relative to the inner face 90c of the base plate 90.

As shown in FIGS. 13 and 14, a bolt hole portion 93 is formed on a lower region of the base plate 90. The bolt hole portion 93 forms an engine side connecting portion 101 fastened to the engine mounting boss 14T (see FIG. 2) of the cylinder head 32 of the engine E by a fastener bolt. A bolt hole 93a is formed on the bolt hole portion 93 to extend therethrough in the thickness direction of the base plate 90. As shown in FIG. 15, the bolt hole portion 93 has a thickness $d_3$ larger than the thickness $d_1$ of the base plate 90 and protrudes inward (rightward) of the vehicle body from the inner face 90c of the base plate 90 as in the above mentioned bolt holes 91 and 92. To be specific, an outer face 93b of the bolt hole portion 93 is flush with an outer face 90b of the base plate 90 and an inner face 93c of the bolt hole 93 is located inward of the vehicle body relative to the inner face 90c of the plate. In this embodiment, the thickness $d_3$ of the lower bolt hole portion 93 connected to the cylinder head 32 of the engine E is set larger than the thickness $d_2$ of the upper bolt hole portions 91 and 92 which are connected to the pivot frame 14.

As shown in FIG. 14, a rib portion 94 is formed on the front side of the base plate 90 so as to protrude from the inner surface 90c of the base plate 90. The rib portion 94 has a predetermined thickness $d_4$ (see FIG. 15) larger than the thickness $d_1$ of the base plate 90. The rib portion 94 has a substantially constant width $w_1$ and is configured to couple the front bolt hole portion 91 of the upper bolt hole portions 91 and 92 to the lower bolt hole portion 93. In this embodiment, the thickness $d_4$ of the bolt hole portion 94 is equal to the thickness $d_2$ of the upper bolt hole portion 91 (see FIG. 15). The thickness $d_4$ and the width $w_1$ of the rib portion 94 are suitably adjusted so that the engine bracket 35L has desired strength and stiffness.

As shown in FIG. 15, as viewed from the rear, the left engine bracket 35L is structured such that a middle portion of the base plate 90 is angled at approximately 45 degrees, and the upper portion and lower portion extend in parallel with each other. As a result, the location of an upper portion is offset outward of the vehicle body relative to a lower portion by a distance $d_5$. The right engine bracket 35R (see FIG. 16) is symmetric to the left engine bracket 35L with respect to the center in the rightward and leftward (lateral) direction of the vehicle body, and therefore will not be further described.

Figure 16:
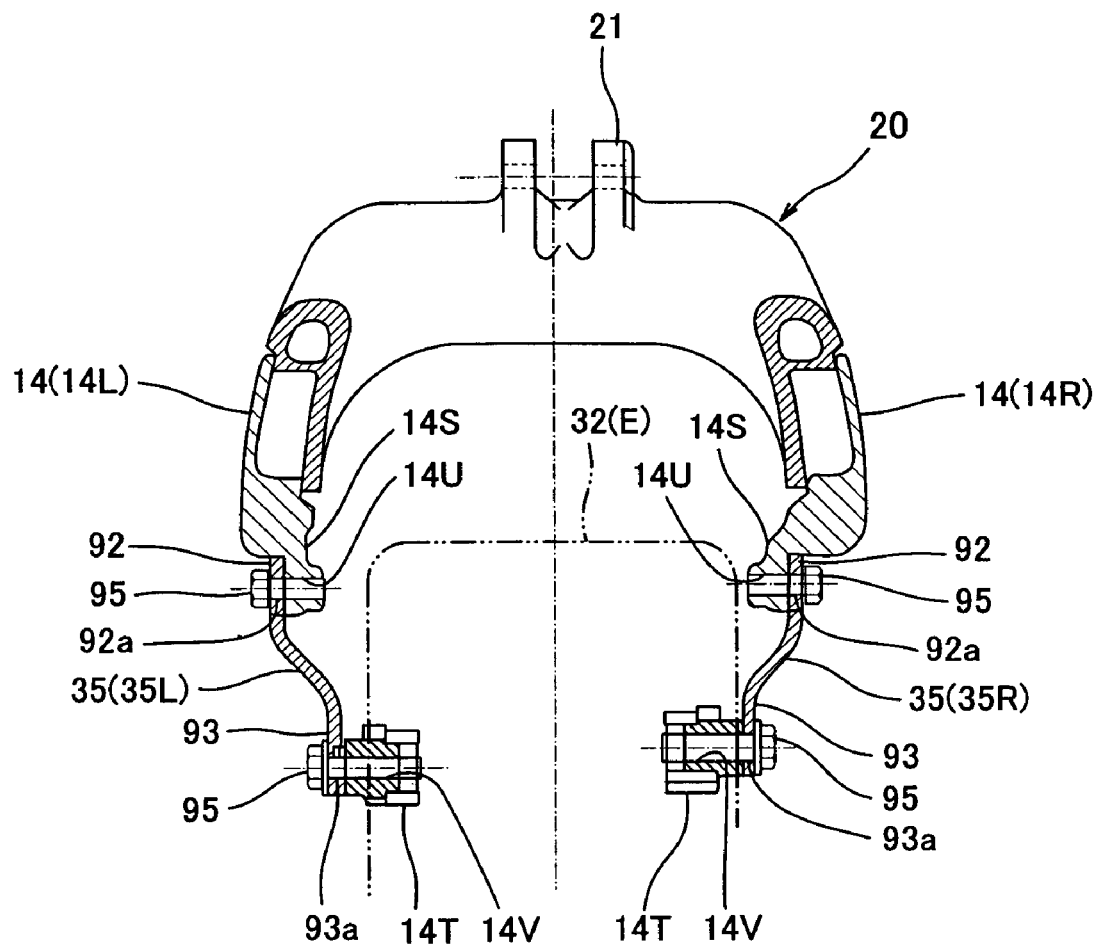
FIG. 16 is a partial cross-sectional view showing the frame and the engine of FIG. 2, which are partly cut away along line XVI-XVI in FIG. 2.

As shown in FIG. 2 and FIG. 16, which is a partial cross-sectional view taken along line XVI-XVI in FIG. 2, the engine bracket 35R (or 35L) is mounted between the pivot frame member 14R (or 14L) and the cylinder head 32 and is configured to couple the pivot frame member 14R (or 14L) and the cylinder head 32 to each other First, the engine bracket 35L is disposed in such a manner that two bolt holes 14U (only rear bolt hole 14U is illustrated in FIG. 16) formed on the engine mounting bracket 14S of the left pivot frame member 14L are coaxial with the bolt holes 91a and 92a (only rear bolt hole 92a is illustrated in FIG. 16) of the upper bolt hole portions 91 and 92 of the left engine bracket 35L, respectively. In this case, the base plate 90 is disposed in such a manner that the outer surface 90b is oriented outward of the vehicle body and the rib portion 94 (see FIG. 14) is oriented forward.

The bolts 95 are threaded into the bolt holes 14U and 91a and the bolt holes 14U and 92a to fasten the engine bracket 35L to the pivot frame member 14L. The bolts 95 are not fastened tightly so that the engine bracket 35L is coupled to the engine mounting bracket 14S of the pivot frame member 14L with some predetermined amount of play within the elongate bolt holes 91a and 92a of the engine bracket 35L.

The engine E is incorporated into the frame 2. The engine E is mounted on the frame 2 by the engine bracket 36 and the engine mounting bracket 37 (see FIG. 2). Under this condition, the left engine mounting boss 14T provided on the cylinder head 32 of the engine E is located forward and downward relative to the engine mounting bracket 14S of the pivot frame member 14L (see FIG. 2). The engine bracket 35L is disposed with respect to the engine such that the bolt hole 14V formed on the engine mounting boss 14T of the cylinder head 32 is coaxial with the bolt hole 93a of the lower bolt hole portion 93 of the engine bracket 35L. Since the engine bracket 35L and the pivot frame member 14L are coupled to each other with predetermined amount of play as described above, the bolt holes 14V and 93a are aligned coaxially regardless of some deviation between the engine E and the pivot frame 14 when the engine E is incorporated into the frame 2.

Under this condition, the bolts 95 are securely threaded into the bolt holes 14V and 93a so that the engine bracket 35L is fastened to the engine E. In addition, the bolts 95 are surely threaded into the bolt holes 14U of the pivot frame member 14L so that the engine bracket 35L is fastened to the pivot frame member 14L.

The right pivot frame member 14R is coupled to the right engine mounting boss 14T of the cylinder head 32 of the engine E by the engine bracket 35R which is symmetric in shape to the left bracket 35L in the same manner that the left pivot frame member 14L is coupled to the left boss 14T of the cylinder head 32. In the right engine bracket 35R of FIG. 16, the same reference numerals as those of the left engine bracket 35L denote the same or corresponding parts, which will not be further described.

The engine bracket 35 (35L and 35R) by which the pivot frame 14 (including members 14L and 14R) is coupled to the engine E extends downward and forward from the bolt hole portions 91 and 92 connected to the engine mounting bracket 14S of the pivot frame 14 to the bolt hole portion 93 connected to the engine mounting boss 14T of the cylinder head 32 of the engine E. Under this condition, in the engine bracket 35L, the rib portion 94 is subjected to tensile stress.

Since the rib portion 94 which is subjected to the tensile stress has the relatively large thickness $d_4$, the engine bracket 35L of this embodiment enables the engine E to be mounted on the pivot frame 14 with suitable strength. In addition, since a region of the base plate 90 which is located rearward of the rib portion 94 has the thickness $d_1$ smaller than the thickness $d_4$ of the rib portion 94, a lightweight engine bracket 35L is achieved. Furthermore, since the rib portion 94 has the suitable width $w_1$, the engine bracket 35L is able to have suitable strength and stiffness. As should be appreciated, the engine bracket 35L of the present invention is manufactured in such a manner that the thickness $d_1$ of the base plate 90 and the thickness $d_4$ and the width $w_1$ of the base portion 94 are suitably adjusted. As a result, strength, stiffness, and weight of the engine bracket 35L are optimized according to, for example, the weight of the engine E.

While in this embodiment the frame side connecting portion 100 of the engine bracket 35L is coupled to the pivot frame 14, it may alternatively be coupled to the main frame 11. Furthermore, the engine side connecting portion 101 may be coupled to the crankcase 30 instead of the cylinder head 32.

The engine bracket 35L may be manufactured from materials other than aluminum alloy and by methods other than the forging, for example, by casting, cutting, or die casting. The shape of the bolt holes 91a and 92a (see FIG. 14) is not intended to be limited to the elongate circle but may be a perfect-circle shape or other suitable shape so long as the engine bracket 35L is coupled to the engine mounting bracket 40 of the pivot frame 14L with suitable play.

The engine bracket of the present invention may be employed to couple frames to engines of cruising and touring type motorcycles and road racer motorcycles as well as to motocross motorcycles, and may also be applied to four-wheeled all terrain vehicles, etc. The above mentioned embodiments are merely exemplary and may be suitably changed within the scope of the present invention.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

What is claimed is:

1. A frame of a motorcycle comprising:
    a head pipe configured to support a steering shaft;
    a first frame configured to extend from the head pipe, through an area above and rearward of an engine, and to an area rearward of a vehicle body of the motorcycle;
    a second frame that is located under the first frame and configured to extend from the head pipe, through an area forward and downward of the engine, and to an area rearward of the vehicle body;
    a bracket by which a first component is mounted to the second frame; and
    a coupling member that is mounted to the second frame and is configured to couple a second component to the second frame;
    wherein the coupling member has the bracket;
    wherein the first frame includes a main frame that is coupled to the head pipe and configured to extend rearward of the vehicle body;
    wherein the second frame includes a down tube that is coupled to the head pipe and configured to extend downward from the head pipe and a lower frame configured to extend from a lower portion of the down tube, through an area under the engine, and to an area rearward of the vehicle body;
    wherein the coupling member includes a gusset configured to couple the main frame to an upper portion of the down tube;
    wherein the bracket includes a radiator mounting bracket by which a radiator is mounted to the down tube;
    and wherein the gusset is provided with the radiator mounting bracket.

2. The frame of a motorcycle according to claim 1, wherein the gusset includes a base portion that is disposed behind the upper portion of the down tube and is configured to couple the main frame to the down tube, and an extending portion configured to extend forward of the vehicle body from the base portion to a lateral side of the down tube;

and wherein the extending portion is with the radiator mounting bracket.

3. The frame of a motorcycle according to claim 1,
wherein the head pipe includes a tongue piece covering an upper portion of the down tube from a front of the down tube;
wherein the gusset is configured to cover the upper portion of the down tube from a rear surface of the down tube and a side of the down tube;
wherein the radiator mounting bracket of the gusset is disposed on a portion of a side face of the upper portion of the down tube which is sandwiched between the tongue piece and the gusset.

4. The frame of a motorcycle according to claim 2,
wherein the base portion includes a down tube connecting portion and a main frame connecting portion;
wherein the down tube connecting portion extends vertically along the down tube and is coupled to the down tube;
and wherein the main frame connecting portion is provided above the down tube connecting portion such that the main frame connecting portion is coupled to the main frame.

* * * * *

UNITED STATES PATENT AND TRADEMARK OFFICE
CERTIFICATE OF CORRECTION

PATENT NO. : 7,637,345 B2  Page 1 of 1
APPLICATION NO. : 11/315584
DATED : December 29, 2009
INVENTOR(S) : Kurokawa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 514 days.

Signed and Sealed this

Ninth Day of November, 2010

David J. Kappos
*Director of the United States Patent and Trademark Office*